(12) United States Patent
Kao

(10) Patent No.: US 8,677,685 B2
(45) Date of Patent: Mar. 25, 2014

(54) HYDROPONIC SYSTEM

(76) Inventor: Chih-Cheng Kao, Sindian (TW)

( * ) Notice: Subject to any disclaimer, the term of this patent is extended or adjusted under 35 U.S.C. 154(b) by 377 days.

(21) Appl. No.: 13/192,730

(22) Filed: Jul. 28, 2011

(65) Prior Publication Data

US 2012/0023821 A1  Feb. 2, 2012

(30) Foreign Application Priority Data

Jul. 29, 2010 (TW) .............................. 99125033 A

(51) Int. Cl.
*A01G 31/00* (2006.01)

(52) U.S. Cl.
USPC .......................................................... 47/62 R

(58) Field of Classification Search
USPC ... 47/59 R, 62 R, 62 A, 62 C, 62 E, 62 N, 63, 47/60, 79
IPC ............................................. A01G 31/00,31/04
See application file for complete search history.

(56) References Cited

U.S. PATENT DOCUMENTS

| | | | |
|---|---|---|---|
| 5,657,577 A * | 8/1997 | Rodder ............................. | 47/64 |
| 6,951,076 B2 * | 10/2005 | Winsbury ....................... | 47/62 R |
| 2007/0209278 A1 * | 9/2007 | Becker .......................... | 47/59 R |

FOREIGN PATENT DOCUMENTS

| | | | |
|---|---|---|---|
| JP | 408289681 | * | 11/1996 |
| JP | 2000217450 | * | 8/2000 |
| JP | 2003339258 | * | 12/2003 |
| JP | 2006230296 | * | 9/2006 |

OTHER PUBLICATIONS

Translation of JP 2006230296.*
Translation of JP 2003339258.*
Translation of JP 408289681.*
Translation of JP 2000217450.*

* cited by examiner

*Primary Examiner* — David Parsley
*Assistant Examiner* — Thien Thanh Pham
(74) *Attorney, Agent, or Firm* — Guice Patents PLLC

(57) ABSTRACT

A hydroponic system consists of a hydroponic tank, a carrier or carriers for carrying or growing plants, a float or floats, and a supplementary lifting unit. The supplementary lifting unit includes a take-up mechanism having a small reel and one or multiple large reels configured subject to the circumference ratio of 1:≥1 so that increasing the fluid level in the hydroponic tank to lift or lower the float one unit-height causes the carriers and the plants thereof to be lowered or lifted one unit-height plus the height corresponding to the circumference ratio between the large reel and the small reel for enabling the roots, stems and leaves of the growing plants to be dipped in the nutrient solution in the hydroponic tank or exposed to the outside air.

10 Claims, 19 Drawing Sheets

A-A

B-B

HYDROPONIC SYSTEM

BACKGROUND OF THE INVENTION

1. Field of the Invention

The present invention relates to hydroponic technology, and more particularly to a hydroponic system having a plant dipping function.

2. Description of the Related Art

Hydroponic techniques have been intensively used in our daily life to raise vegetables and fruits. Covering a hydroponic system with a proper net or installing a hydroponic system in a greenhouse may raise plants without any agricultural pesticides, avoiding part of plant diseases by traditional soil farming.

A conventional hydroponic system generally comprises a hydroponic tank holding nutrient solution, and at least one rectangular carrier floating on the nutrient solution in the hydroponic tank. Each rectangular carrier has a plurality of vertical holes respectively attached with one respective perforated dish for holding seedling. The growing plants carried in the perforated dishes on the rectangular carrier can absorb water and nutrients through root from the nutrient solution in the hydroponic tank.

Plants can absorb nutrients not only through the roots but also through the stems and leaves. Therefore, dipping growing plants in the nutrient solution in a hydroponic system facilitates the whole growing plants to absorb nutrients rapidly, eliminating the problem of slow absorption due to limited transfer of nutrients from the roots through the stems to the leaves or other tissues.

In view of the aforesaid problems, the present applicant filed to the local patent office a patent application on May 14, 2010, under number 099115393, entitled "Hydroponic system", which includes a hydroponic tank equipped with at least one water intake pipe and at least one discharge pipe and holding a nutrient solution, a carrier unit having a first carrier and a second carrier for carrying or growing plants, wherein the specific gravity of the first carrier and the second carrier is smaller than the specific gravity of the nutrient solution, and the total buoyancy of the first carrier totally immersed in the nutrient solution subtracting the gross weight of the first carrier is greater than the total buoyancy of the second carrier and the plants thereof totally immersed in the nutrient solution subtracting the gross weight of the second carrier and the plants thereof, and a guide mechanism, which includes guide members located corresponding to the first and second carriers and a drag rope inserted through each pair of guide members and connected between the first carrier and the second carrier. When adding one unit-height of nutrient solution to the hydroponic tank through the water intake pipe, the first carrier is lifted with the raising fluid level and the second carrier with the attached growing plants are lowered for 2 unit-heights relative to the fluid level so that the roots, stems and leaves of the growing plants at the second carrier can absorb nutrients from the nutrient solution.

The aforesaid hydroponic system enables the roots, stems and leaves of the growing plants to be dipped in a nutrient solution to absorb the necessary nutrients from the nutrient solution, and also enables one carrier and the attached growing plants to be lifted with the fluid level of the hydroponic tank for one unit-height and the other carrier and the attached growing plants to be lowered for 2 unit-heights relative to the fluid level of the hydroponic tank when adding an amount of the nutrient solution to the hydroponic tank for one unit-height, thereby satisfying the practice of energy saving and carbon reduction.

Therefore, it is desirable to provide a hydroponic system having a simplified mechanical structural design that enables at least one carrier and the plants thereof be lowered for 2 unit-heights relative to the fluid level of the hydroponic tank when adding an amount of the nutrient solution to the hydroponic tank for one unit-height, shortening the water pump operating time and achieving energy saving and carbon reduction.

SUMMARY OF THE INVENTION

The present invention has been accomplished under the circumstances in view. It is one object of the present invention to provide a hydroponic system, which enables the roots, stems and leaves of the growing plants to be dipped in a nutrient solution to absorb the necessary nutrients from the nutrient solution in full way.

It is another object of the present invention to provide a hydroponic system, which enables a float to be lifted with the fluid level of the hydroponic tank for one unit-height and at least one carrier and the plants carried or grown thereon to be lowered for at least 2 unit-heights relative to the fluid level of the hydroponic tank when adding an amount of the nutrient solution to the hydroponic tank for one unit-height, thereby satisfying the practice of energy saving and carbon reduction.

To achieve these and other objects of the present invention, a hydroponic system for growing plants comprises a hydroponic tank having at least one water intake pipe for guiding in a nutrient solution and at least one discharge pipe for discharging of the nutrient solution out of the hydroponic tank; at least one float and at least one carrier for growing plants, each float having a specific gravity smaller than the specific gravity of the nutrient solution, each carrier and the plants thereof having an average specific gravity greater than the specific gravity of the nutrient solution; and a supplementary lifting unit, the supplementary lifting unit comprising a support member horizontally disposed above the hydroponic tank and a take-up mechanism arranged at the support member, the take-up mechanism comprising at least one small reel, at least one large reel, a first drag rope wound round each small reel and having a free end connected to the at least one float and a second drag rope wound round each large reel and having a free end connected to the at least one carrier, the circumference ratio between each small reel and each large reel being $1:\geq 1$. The gross weight of the float is greater than the gross weight of the carrier and the plants thereof subtracting the total buoyancy of the carrier totally immersed in the nutrient solution then multiplying the circumference ratio between the large reel and the small reel; adding the nutrient solution through the at least one water intake pipe into the hydroponic tank to lift the at least one float corresponding to one unit-height or discharging the nutrient solution out of the hydroponic tank through the at least one discharge pipe to lower the float corresponding to one unit-height causes the at least one carrier to be lowered or lifted the height corresponding to the circumference ratio between the large reel and the small reel plus one unit-height for enabling the roots, stems and leaves of the growing plants to be dipped in the nutrient solution in the hydroponic tank or exposed to the outside air.

In an alternate form of the present invention, a hydroponic system comprises for growing plants comprises a hydroponic tank having at least one water intake pipe for guiding in a nutrient solution and at least one discharge pipe for discharging of the nutrient solution out of the hydroponic tank; at least one float and at least one carrier for growing plants, each float having a specific gravity smaller than the specific gravity of the nutrient solution, each carrier and the plants thereof having an average specific gravity smaller than the specific gravity of the nutrient solution; and a supplementary lifting unit, the supplementary lifting unit comprising a take-up mechanism arranged at the bottom side in the hydroponic tank, the take-up mechanism comprising at least one small reel, at least one large reel, a first drag rope wound round each small reel and having a free end connected to the at least one float and a second drag rope wound round each large reel and having a free end connected to the at least one carrier, the circumference ratio between each small reel and each large reel being 1:≥1. The total buoyancy of the at least one float totally immersed in the nutrient solution subtracting the gross weight of the float is greater than the total buoyancy of the at least one carrier and the plants thereof totally immersed in the nutrient solution subtracting the gross weight of the carrier and the plants thereof then multiplying the circumference ratio between the large reel and the small reel; adding the nutrient solution through the at least one water intake pipe into the hydroponic tank to lift the at least one float corresponding to one unit-height causes the at least one carrier to be lowered one unit-height plus the height corresponding to the circumference ratio between the large reel and the small reel for enabling the roots, stems and leaves of the growing plants to be dipped in the nutrient solution in the hydroponic tank.

DETAILED DESCRIPTION OF THE PREFERRED EMBODIMENT

Referring to FIGS. 1, 2, 3a and 3b, a hydroponic system in accordance with a first embodiment of the present invention is shown comprising a hydroponic tank 1, at least one float 2, at least one carrier 3 and a supplementary lifting unit 4.

Figure 1:
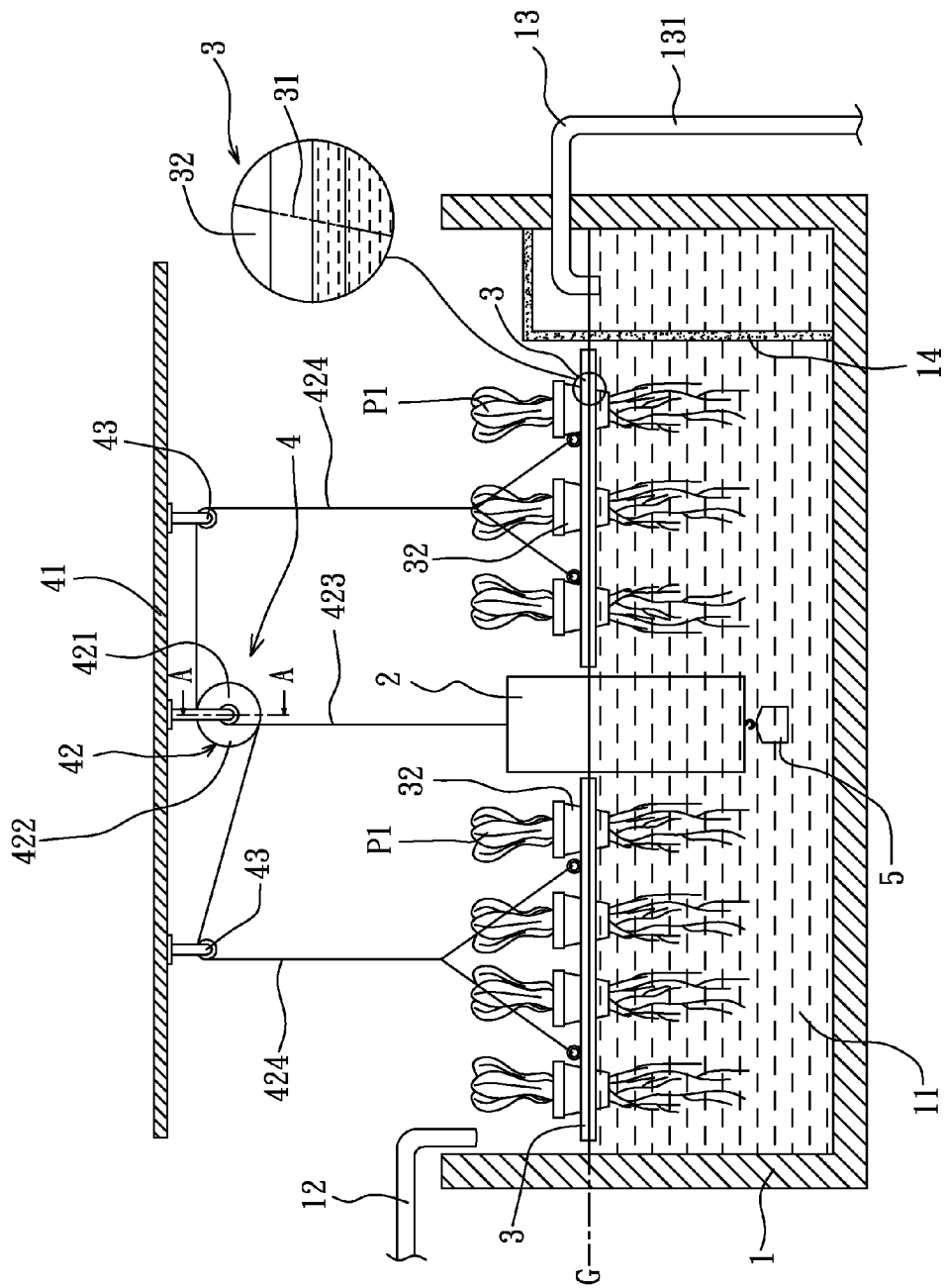
FIG. 1 is a schematic view of a hydroponic system in accordance with a first embodiment of the present invention.

The hydroponic tank 1 is a box-like vessel for holding a nutrient solution 11 that provides the necessary nutrients for plants P1 carried or grown on at least one carrier 3. To allow adjustment of the level of the nutrient solution 11 in the hydroponic tank 1, the hydroponic tank 1 is provided with at least one water intake pipe 12 and at least one discharge pipe 13. As shown in FIG. 1, the discharge pipe 13 is a siphon pipe 131 inserted through one sidewall of the hydroponic tank 1. However, this is not a limitation, for example, the discharge pipe 13 can be a water pipe set at a predetermined elevation or at the bottom side of the hydroponic tank 1. Further, a filter 14 is installed in the upstream of the discharge pipe 13 to remove solid matters, etc., avoiding clogging. The filter 14 can be, for example, a wire gauze filter. As the filter 14 is of the known art, no further detailed description in this regard is necessary.

The float 2 has a specific gravity smaller than the nutrient solution 11 so that it floats on the level of the nutrient solution 11 in the hydroponic tank 1. The float 2 can have, but not limited to, a cylindrical shape, or can be a float member formed by plural smaller float members. FIG. 1 illustrates one single float 2 used. However, multiple floats may be used without limitation.

The carrier 3 is adapted for carrying plants or growing plants P1, and the carrier 3 and the plants P1 thereof have an average specific gravity greater than the nutrient solution 11. Therefore, the carrier 3 can be dipped with the plants P1 in the nutrient solution 11. Further, the gross weight of the float 2 is greater than the gross weight of the carrier 3 and the plants P1 thereof subtracting the total buoyancy of the carrier 3 totally immersed in the nutrient solution 11 then multiplying the circumference ratio between the large reel and the small reel (this will be explained further) so that the float 2 will not be dragged by the carrier 3. As illustrated in FIG. 1, two carriers 3 are respectively arranged at two opposite lateral sides of the float 2. The carriers 3 are elongated flat plate members each having a plurality of tapered receptacle holes 31 and a culture dish 32 set in each tapered receptacle hole 31 for growing plants P1. Plants P1 are suitable for water dipping, such as lettuce, water convolvulus, spinach . . . , and etc.

Further, at least one weight 5 may be attached to each float 2 or carrier 3 and the plants P1 thereof to adjust the weight.

The supplementary lifting unit 4 enables the float 2 and the carriers 3 to float subject to the variation of the fluid level of the nutrient solution 11 in the hydroponic tank 1. As illustrated in FIG. 1, the supplementary lifting unit 4 comprises at least a support member 41 horizontally disposed above the hydroponic tank 1. The support member 41 can be a transversely disposed platform or rod member. The supplementary lifting unit 4 further comprises at least one take-up mechanism 42 and at least one guide member 43 arranged at the support member 41 corresponding to the at least one float 2 and the at least one carrier 3. Further, the guide member 43 can be a guide pulley or fixed ring.

Figure 2:
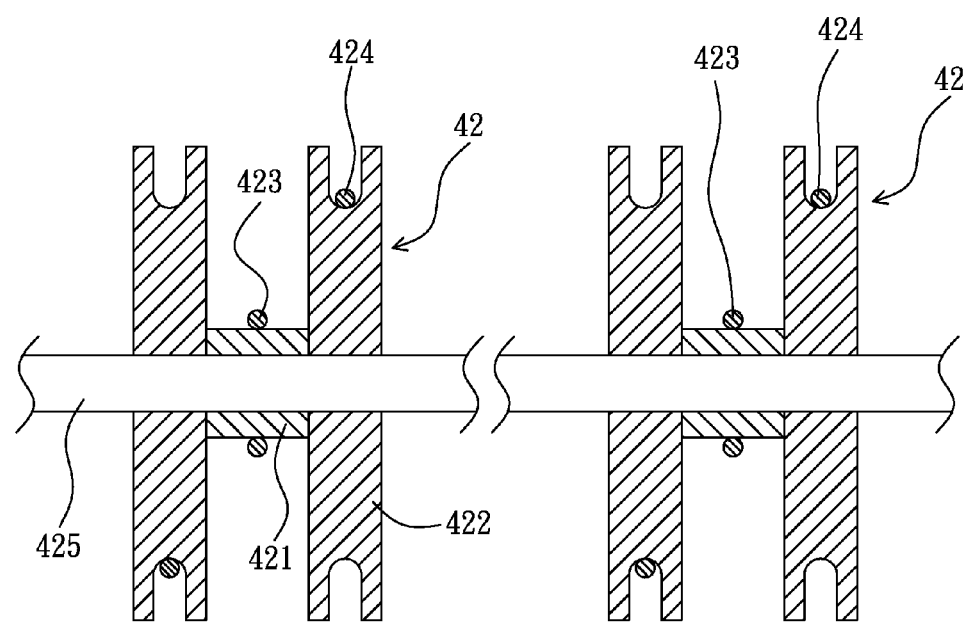
FIG. 2 is a sectional view taken along line A-A of FIG. 1.

As illustrated in FIG. 2, two take-up mechanisms 42 are sleeved in parallel by a pivot shaft 425. However, this mounting arrangement is not a limitation. Take-up mechanisms 42 can be respectively pivotally coupled to the support member 41 or the bottom side of the hydroponic tank 1 by a respective pulley.

Each take-up mechanism 42 comprises a small reel 421 and at least one large reel 422. The circumference ratio between the small reel 421 and the large reels 422 is 1:≧1. According to the embodiment shown in FIG. 1, the circumference ratio between the small reel 421 and the large reels 422 is 1:3. Further, a first drag rope 423 is wound round the small reel 421 with the free end thereof connected to the float 2; a second drag rope 424 is wound round each large reel 422 with the free end thereof connected to one carrier 3.

Referring to FIG. 1 again, the gross weight of the float 2 sets off the sinking force of the two carriers 3 and the plants P1 thereof so that the two carriers 3 are kept on the level G of the nutrient solution 11, and the roots of the plants P1 carried in the carriers 3 are maintained dipping in the nutrient solution 11 to absorb the necessary nutrients for growth.

Figure 3A:
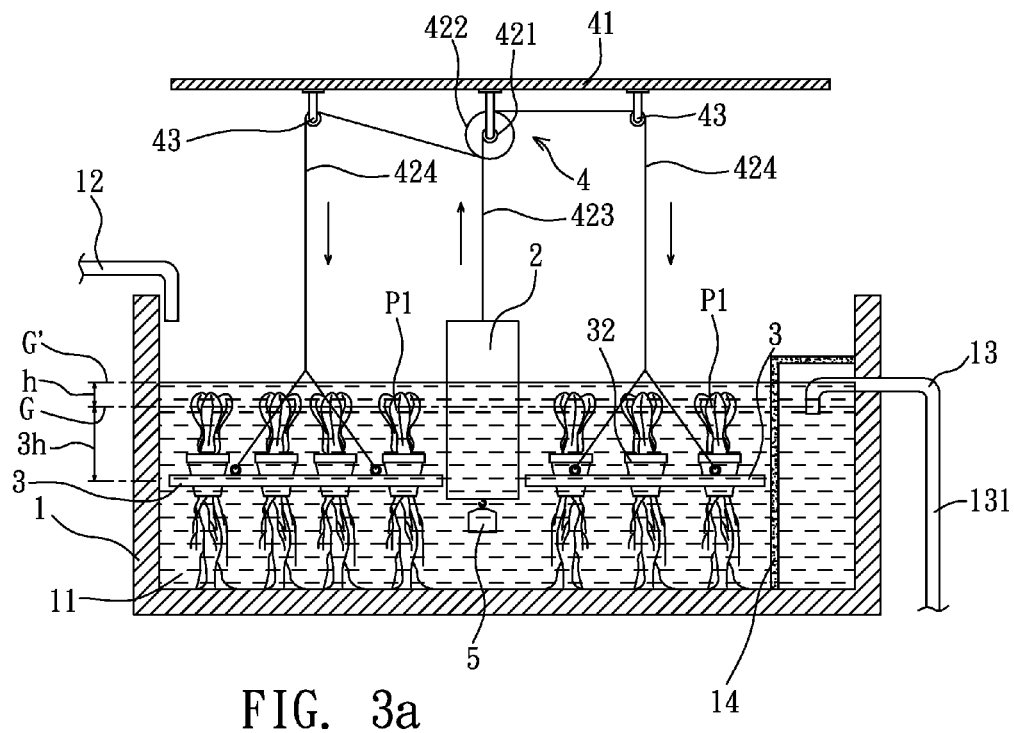
FIG. 3a is a schematic drawing of the first embodiment of the present invention, illustrating the carriers dipped in the nutrient solution in the hydroponic tank.

Referring to FIG. 3a, when wishing to dip the carriers 3 and the plants P1 thereof in the nutrient solution 11 for enabling the stems and leaves of the plants P1 to absorb nutrients, the user needs only to supply an additional amount of one unit-height (1h) of the nutrient solution 11 to the hydroponic tank 1 through the water intake pipe 12, raising the fluid level from the level G shown in FIG. 1 to the level G' shown in FIG. 3a. At this time, the float 2 and the connected first drag rope 423 are lifted upwards a distance corresponding one unit-height (1h), causing the carriers 3 to sink. The sinking force of the carriers 3 and the plants P1 thereof pulls the respective second drag ropes 424 at this time. Therefore, the small reel 421 and the large reels 422 are rotated through one same angle. At this time, the small reel 421 rolls up the first drag rope 423 corresponding to the distance of one unit-height (1h) released by the float 2. At the same time, the large reels 422 release the respective second drag ropes 424 corresponding to three unit-heights (3h). Due to that the level of the nutrient solution 11 in the hydroponic tank 1 has been raised one unit-height (1h), the carriers 3 and the plants P1 thereof totally sink 4 unit-heights (4h) relative to the current nutrient solution fluid level G', and are dipped in the nutrient solution 11.

Thus, when the water pump pumps the prepared nutrient solution 11 through the water intake pipe 12 into the hydroponic tank 1 to increase the fluid level in the hydroponic tank 1 one unit-height (1h), the carriers 3 and the plants P1 thereof are lowered 4 unit-heights (4h) relative to the current nutrient solution fluid level, getting the result with one fourth the effort and saving much electric power.

Figure 3B:
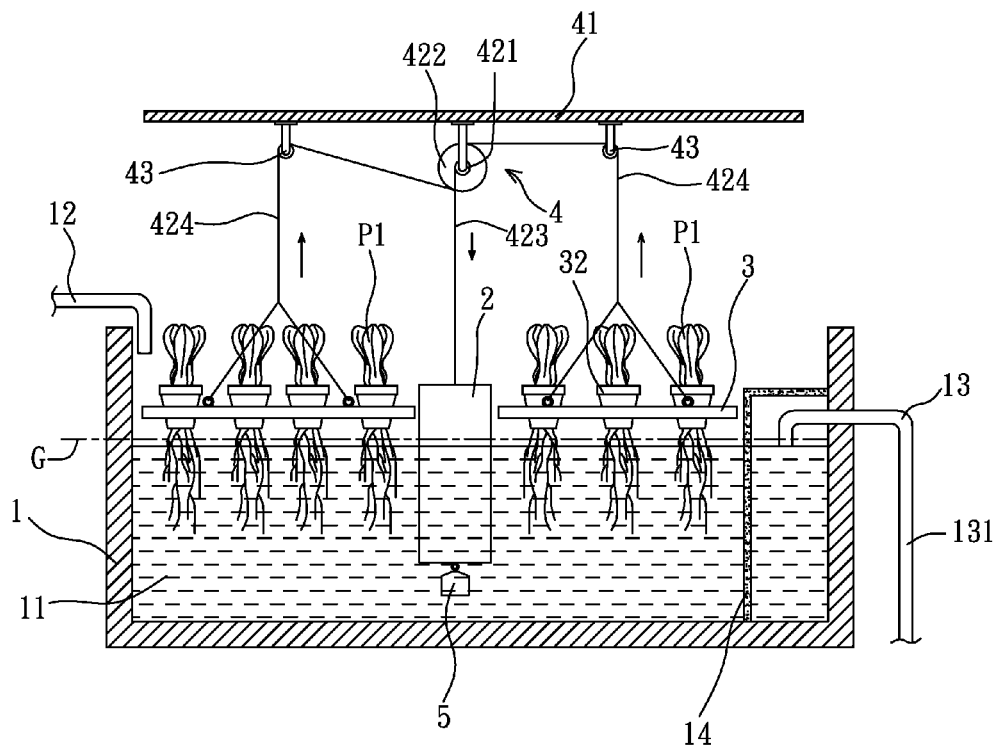
FIG. 3b is a schematic drawing of the first embodiment of the present invention, illustrating the carriers lifted from the nutrient solution in the hydroponic tank.

When wishing to release the carriers 3 and the plants P1 thereof from dipping after a certain period of time in dipping, open the discharge pipe 13 to discharge the nutrient solution 11 to the extent where the carriers 3 float on the fluid level of the nutrient solution 11 in the hydroponic tank 1, as shown in FIG. 1, or the extent where the fluid level of the nutrient solution 11 in the hydroponic tank 1 is equal to the elevation of the water inlet of the discharge pipe 13 so that the float 2 floats downwards from the previous fluid level G to the current fluid level of the nutrient solution 11 in the hydroponic tank 1 to drag the first drag rope 423 and to further rotate the small reel 421, enabling the large reels 422 to roll up the respective second drag ropes 424 and to further lift the carriers 3, and therefore the leaves and roots of the growing plants P1 are exposed to the outside air to increase the amount of aeration of the growing plants P1, as shown in FIG. 3b. Thus, by means of setting of the discharging fluid level, the elevation of part of the roots of the growing plants P1 at the carrier 3 relative to the fluid level of the nutrient solution 11 in the hydroponic tank 1 is relatively adjusted.

Figure 4:
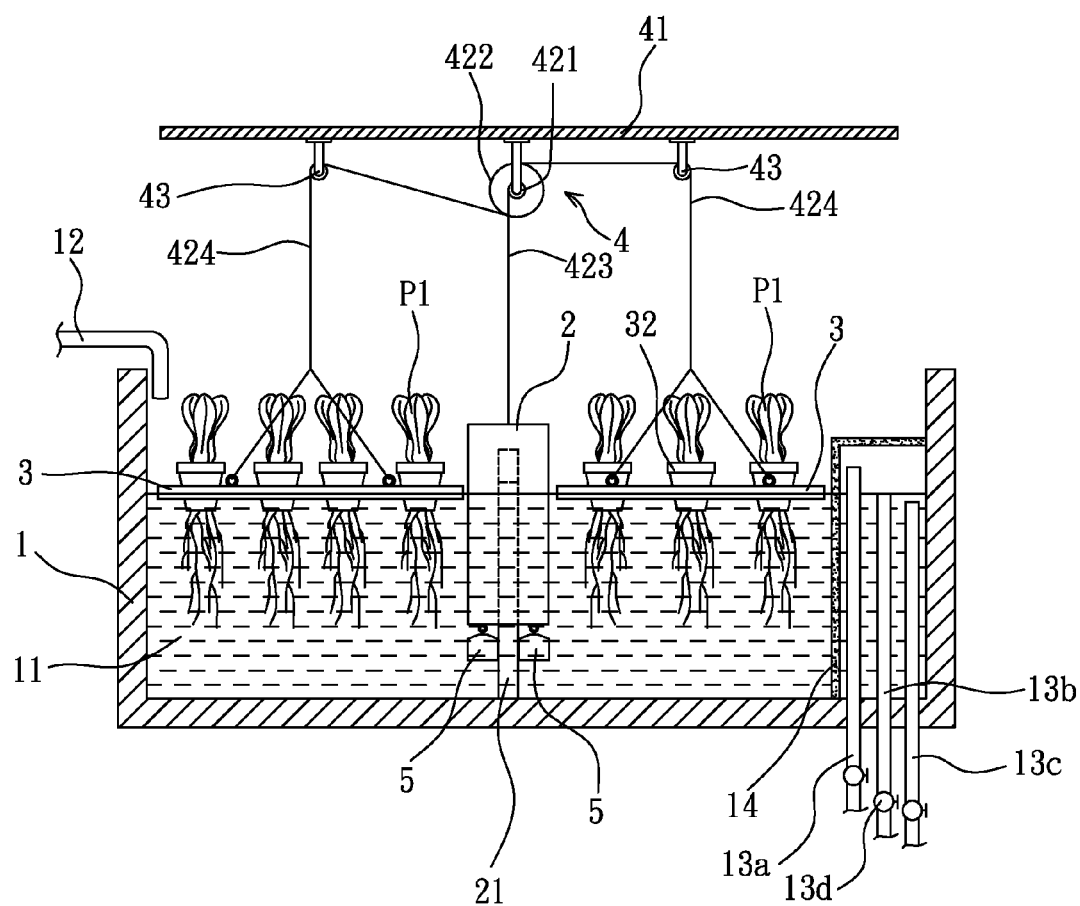
FIG. 4 illustrates an alternate form of the hydroponic system in accordance with the first embodiment of the present invention.

FIG. 4 illustrates an alternate form of the hydroponic system in accordance with the first embodiment of the present invention. According to this alternate form, the float 2 is coupled to and movable along an upright post 21 at the bottom side in the hydroponic tank 1; a fluid level control mechanism is provided to substitute for the siphon pipe 131, comprising a dip-control discharge pipe 13a, a balance-control discharge pipe 13b, an aeration-control discharge pipe 13c, wherein the dip-control discharge pipe 13a and the balance-control discharge pipe 13b are respectively installed with a control valve 13d for opening/closing the balance-control discharge pipe 13b and the aeration-control discharge pipe 13c to regulate the fluid level of the nutrient solution 11 in the hydroponic tank 1 for enabling the carriers 3 to be dipped in the nutrient solution 11, floating on the fluid level of the nutrient solution 11 or lifted above the fluid level of the nutrient solution 11. With respect to the structural details and functioning of the fluid level control mechanism, please refer to FIGS. 7, 8a and 8b of Patent Number 099115393 invented by the present applicant.

Figure 5A:
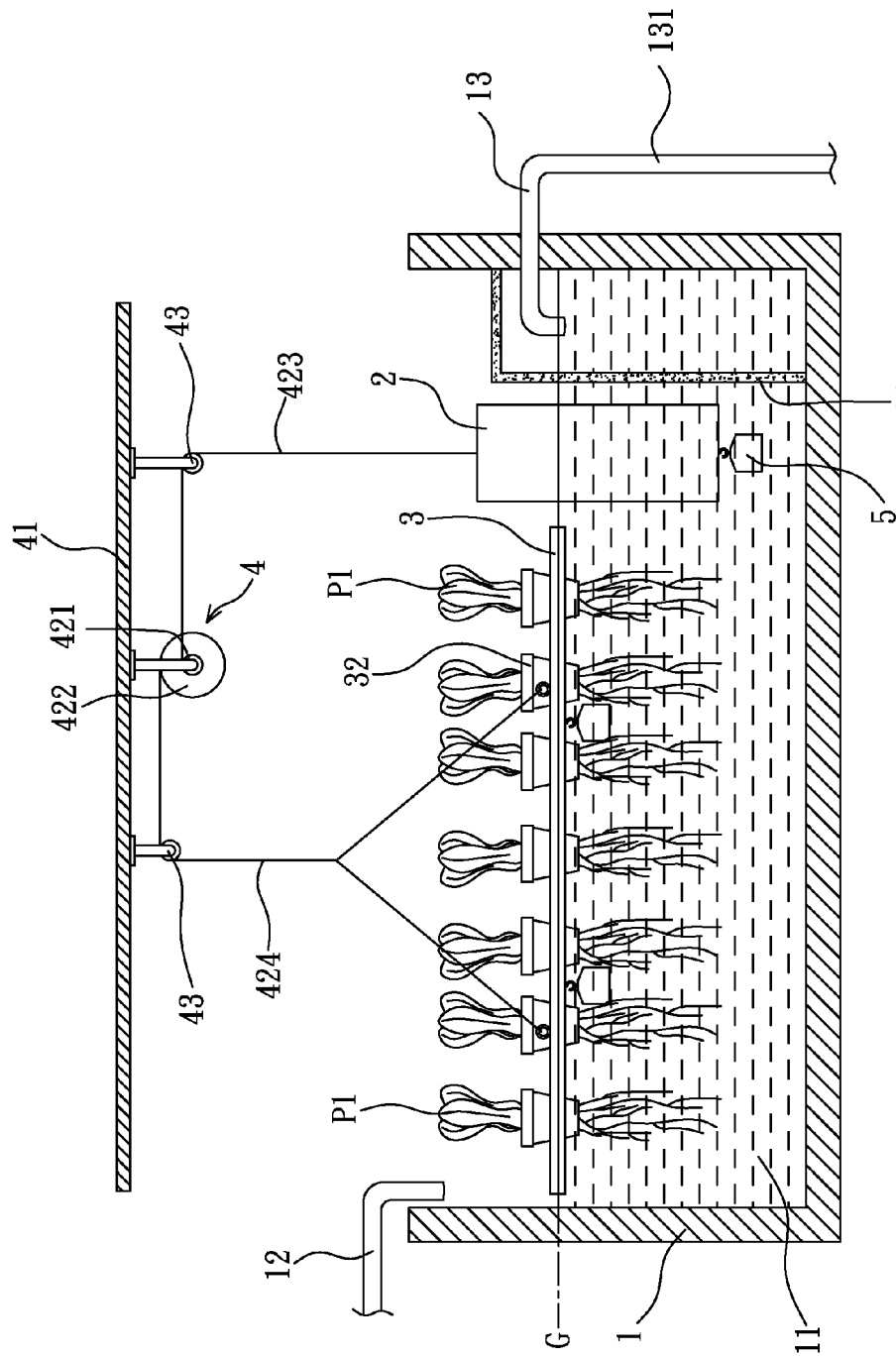
FIG. 5a illustrates another alternate form of the hydroponic system in accordance with the first embodiment of the present invention.

FIG. 5a illustrates another alternate form of the hydroponic system in accordance with the first embodiment of the present invention. According to this alternate form, the hydroponic system consists of a hydroponic tank 1, a float 2, a carrier 3 and a supplementary lifting unit 4. The supplementary lifting unit 4 comprises one support member 41, a take-up mechanism 42 arranged at the bottom side of the support member 41 and two guide members 43 arranged at the bottom side of the support member 41 at two opposite sides relative to the take-up mechanism 42. The first drag rope 423 at the small reel 421 and the second drag rope 424 at the large reel 422 have the respective free ends respectively extending through the guide members 43 and then respectively connected to the float 2 and the carrier 3 and the plant P1 thereof. Further, the carrier 3 and the plants P1 thereof are selectively attached with weights 5 to adjust the average specific gravity of the carrier 3 and the plants P1 thereof.

Figure 5B:
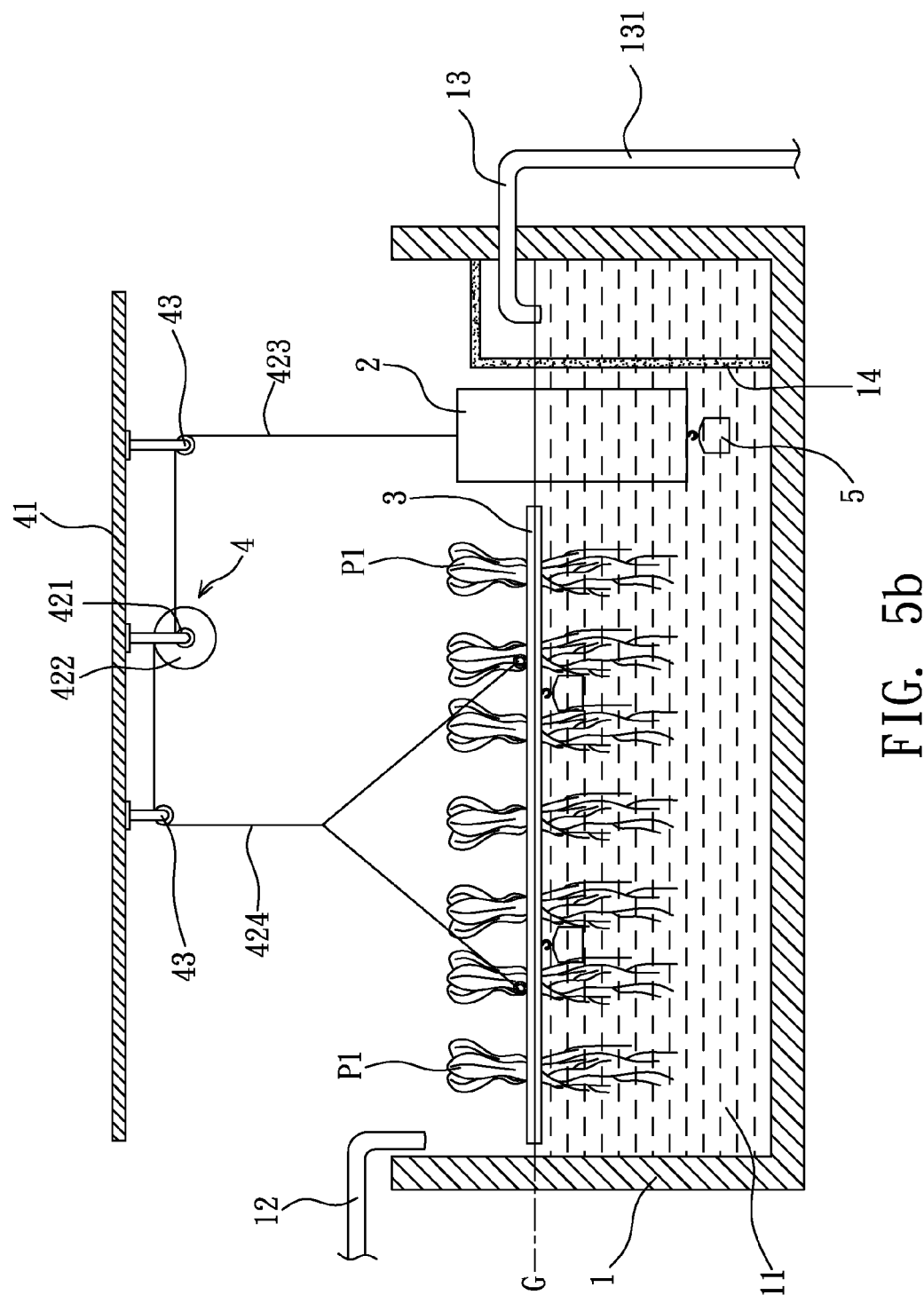
FIG. 5b illustrates still another alternate form of the hydroponic system in accordance with the first embodiment of the present invention.

FIG. 5b illustrates still another alternate form of the hydroponic system in accordance with the first embodiment of the present invention. According to this alternate form, each carrier 3 has a plurality of vertical receptacle holes; plants P1 are planted in a planting material and then put with the planting material in the receptacle holes in each carrier 3. Alternatively, a planting material can be wrapped about the roots or the lower part of the stems of plants P1 and then put with the plants P1 in the receptacle holes in each carrier 3.

Figure 6:
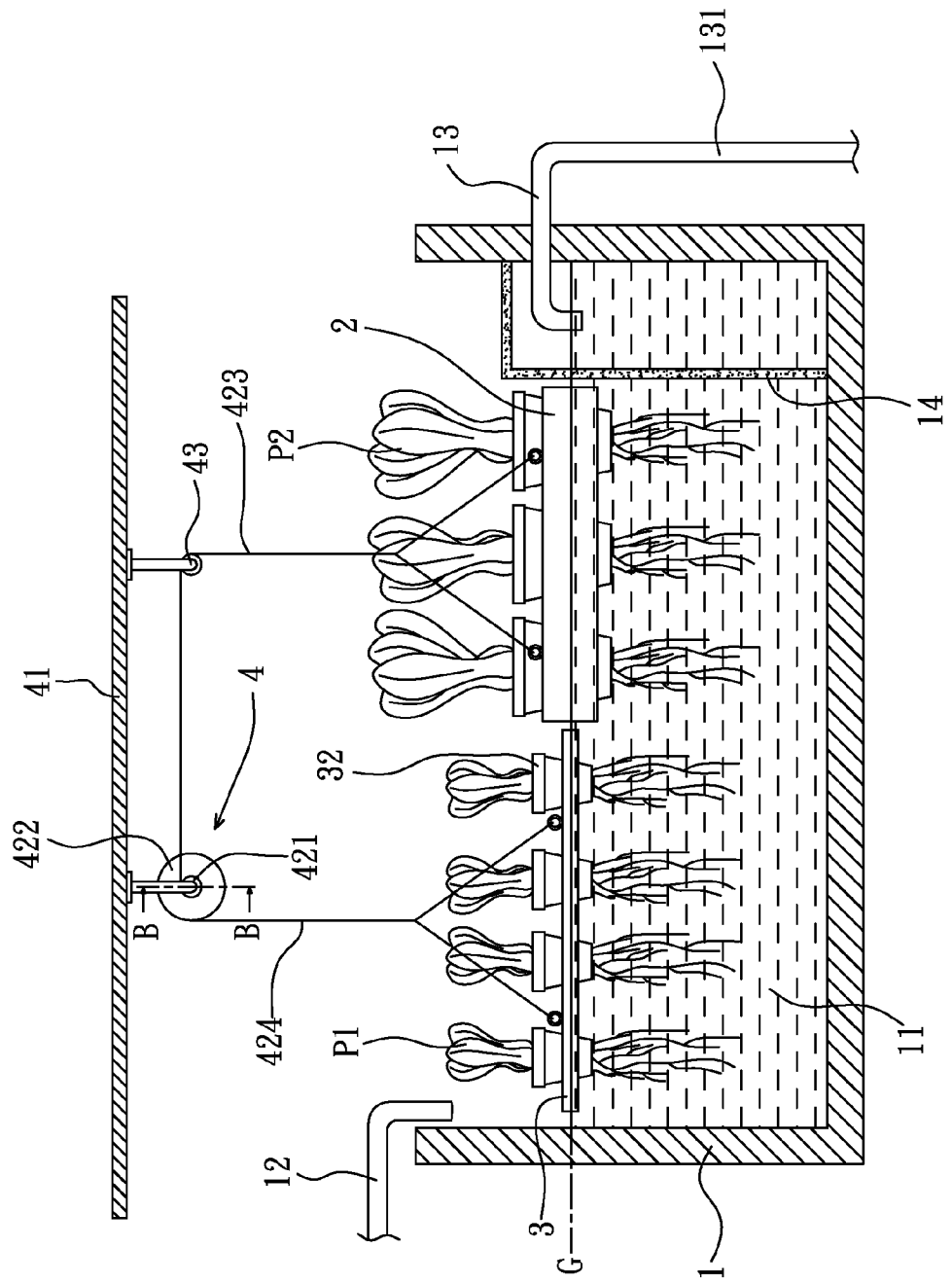
FIG. 6 is a schematic view of a hydroponic system in accordance with a second embodiment of the present invention.

FIG. 6 illustrates a hydroponic system in accordance with a second embodiment of the present invention. According to this second embodiment, the float 2 are elongated flat plate members; plants P2 may be directly set in respective receptacle holes at each float 2, or carried in culture dishes and then respectively set in the receptacle holes at each float 2. The float 2 is constantly floating on the fluid level of the nutrient solution 11. The plants P2 can be tall plants or those not suitable for water dipping, such as Chinese cabbage, cabbage, tomato, cucumber . . . , and etc.

Figure 7:
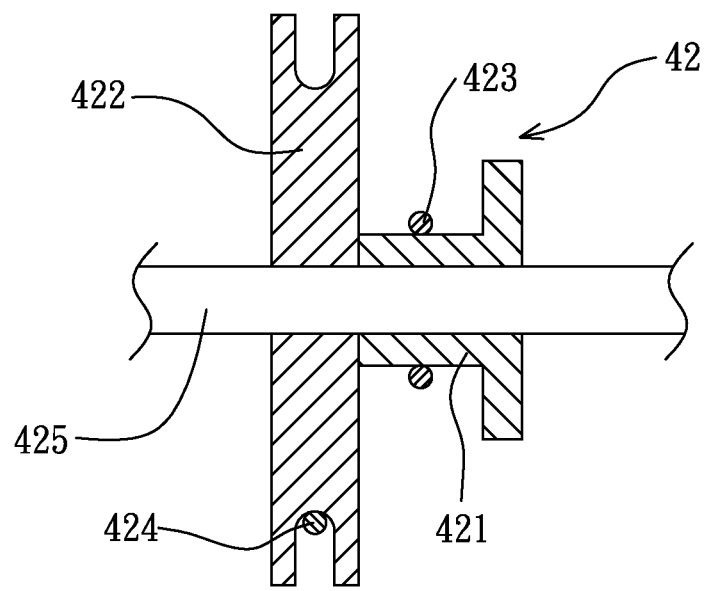
FIG. 7 is a sectional view taken along line B-B of FIG. 6.

Referring to FIG. 7, as only float(s) 2 and carriers 3 with growing plants P2; P1 are set in the hydroponic tank 1, the take-up mechanism 42 of the supplementary lifting unit 4 that is pivotally mounted on the pivot shaft 425 comprises only one small reel 421 and one large reel 422. The number of the at least one large reel 422 depends on the number of the at least one carrier 3. According to this embodiment, two large reels 422 are provided at two opposite sides of the small reel 421. The circumference ratio between the small reel 421 and the large reel 422 is 1:3. Further, the second drag rope 424 that is wound round each large reel 422 has the free end thereof directly connected to the carrier 3. The first drag rope 423 that is wound round the small reel 421 has the free end thereof extending through one guide member 43 and then connected to the float 2.

Referring to FIG. 6 again, the gross weight of the float 2 sets off the sinking force of the carrier 3 and the plants P1 thereof so that the float 2 and the carrier 3 are floating on the fluid level G of the nutrient solution 11; the roots of the growing plants P1;P2 are dipping in the nutrient solution 11 to absorb the necessary nutrients.

Figure 8A:
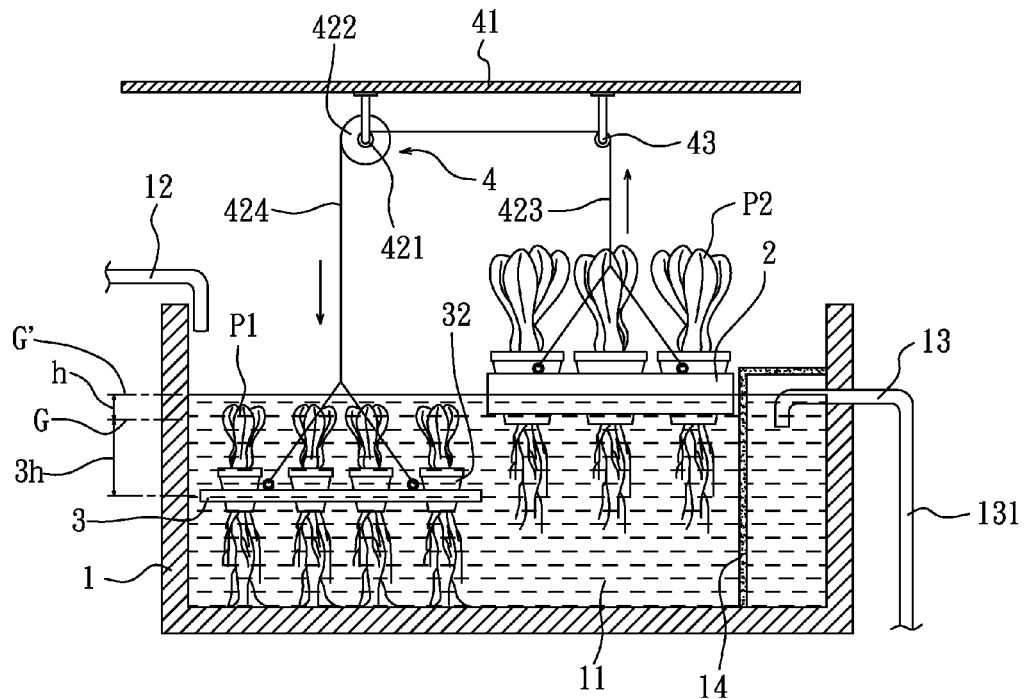
FIG. 8a is a schematic drawing of the second embodiment of the present invention, illustrating the carriers dipped in the nutrient solution in the hydroponic tank.

Referring to FIG. 8a, when wishing to dip the carrier 3 and the plants P1 thereof in the nutrient solution 11 in the hydroponic tank 1, fill an extra amount of the nutrient solution 11 corresponding to one unit-height (1h) through the water intake pipe 12 into the hydroponic tank 1, causing the fluid level to be increased from the original level G shown in FIG. 6 to the new level G' shown in FIG. 8a. At this time, the float 2 with the growing plants P2 and the connected first drag rope 423 are lifted to release one unit-height (1h), and the sinking force of the carrier 3 and the plants P1 thereof pulls the second drag rope 424, causing the small reel 421 and the large reel 422 to be rotated through one same angle. At this time, the small reel 421 rolls up the first drag rope 423 corresponding to the distance of one unit-height (1h) released by the float 2. At the same time, the large reel 422 releases the respective second drag ropes 424 corresponding to three unit-heights (3h). Due to that the level of the nutrient solution 11 in the hydroponic tank 1 has been raised one unit-height (1h), the carrier 3 and the plants P1 thereof totally sink 4 unit-heights (4h) relative to the current nutrient solution fluid level G', and therefore, the carrier 3 and the plants P1 thereof are dipped in the nutrient solution 11.

Thus, when the water pump pumps the prepared nutrient solution 11 through the water intake pipe 12 into the hydroponic tank 1 to increase the fluid level in the hydroponic tank 1 one unit-height (1h), the carrier 3 and the plants P1 thereof are lowered 4 unit-heights (4h) relative to the current nutrient solution fluid level, getting the result with one fourth the effort and saving much electric power.

Figure 8B:
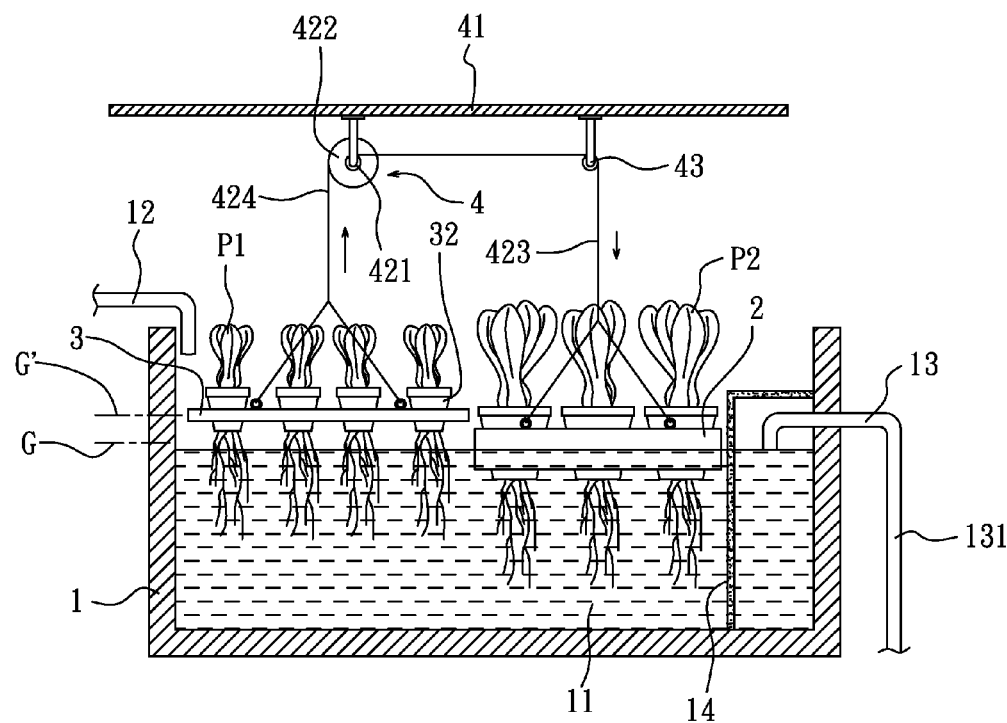
FIG. 8b is a schematic drawing of the second embodiment of the present invention, illustrating the carriers lifted from the nutrient solution in the hydroponic tank.

When wishing to release the carrier 3 and the plants P1 thereof from dipping after a certain period of time in dipping, open the discharge pipe 13 to discharge the nutrient solution 11 and to lower the fluid level of the nutrient solution 11 in the hydroponic tank 1 to the elevation of the water inlet of the discharge pipe 13, as shown in FIG. 8b. At this time, the float 2 with the associated growing plants P2 float downwards from the previous fluid level G to the current fluid level of the nutrient solution 11 in the hydroponic tank 1 to drag the first drag rope 423 and to further rotate the small reel 421, enabling the large reel 422 to roll up the respective second drag ropes 424 and to further lift the carriers 3, and therefore the leaves and roots of the growing plants P1 are exposed to the outside air to increase the amount of aeration of the growing plants P1.

Figure 9:
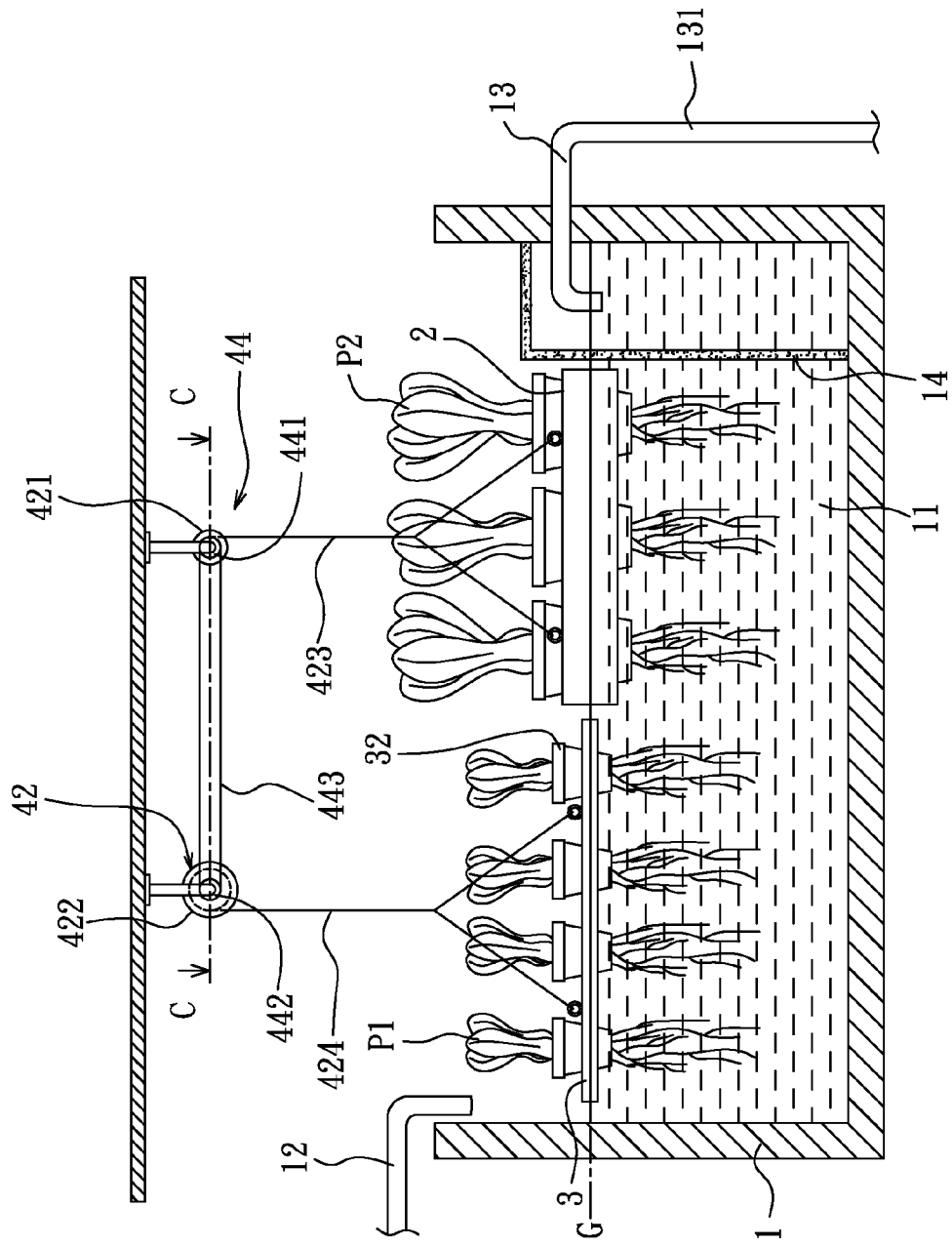
FIG. 9 is a schematic view of a hydroponic system in accordance with a third embodiment of the present invention.
Figure 10A:
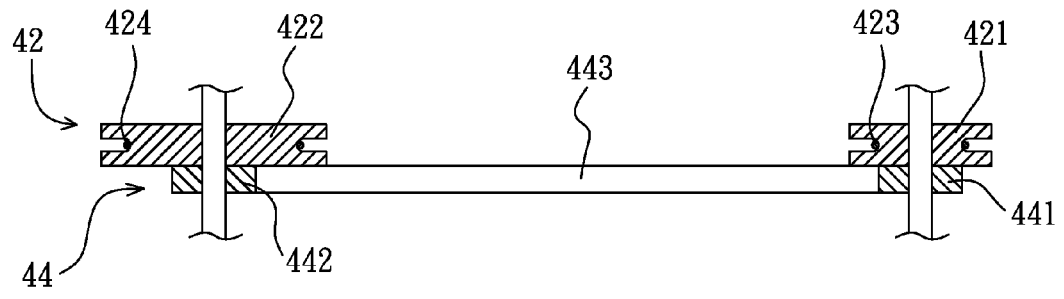
FIG. 10a is a sectional view taken along line C-C of FIG. 9.

FIG. 9 illustrates a hydroponic system in accordance with a third embodiment of the present invention. This third embodiment is substantially similar to the aforesaid second embodiment with the exception that the small reel 421 and the large reel 422 of the take-up mechanism 42 in accordance with this third embodiment are not arranged in a coaxial manner, i.e., the small reel 421 and the large reel 422 are respectively pivotally arranged above the float 2 and the carrier 3, and a transmission mechanism 44 is coupled between the small reel 421 and the large reel 422. As illustrated in FIG. 9 and FIG. 10a, the transmission mechanism 44 comprises a first transmission shaft 441 and a second transmission shaft 442 respectively axially connected to the small reel 421 and the large reel 422, and a transmission belt (or transmission chain or gear set) 443 coupled between the first transmission shaft 441 and the second transmission shaft 442 for enabling the first transmission shaft 441 and the second transmission shaft 442 to be synchronously rotated. To avoid dragging of the float 2 by the carrier 3, the gross weight of the float 2 must be greater than the gross weight of the carrier 3 and the plants P1 thereof subtracting the total buoyancy of the carrier 3 totally immersed in the nutrient solution 11 then respectively multiplying the circumference ratio between the large reel 422 and the small reel 421 and the circumference ratio between the first transmission shaft 441 and the second transmission shaft 442. Further, the first transmission shaft 441 and the second transmission shaft 442 can be belt wheels or gearwheels.

According to the design shown in FIG. 10a, the circumference ratio between the small reel 421 and the large reel 422 is 1:2; the circumference ratio between the first transmission shaft 441 and the second transmission shaft 442 is 1:1. The first drag rope 423 at the small reel 421 has its free end connected to the float 2. The second drag rope 424 at the large reel 422 has its free end connected to the carrier 3.

Figure 11A:
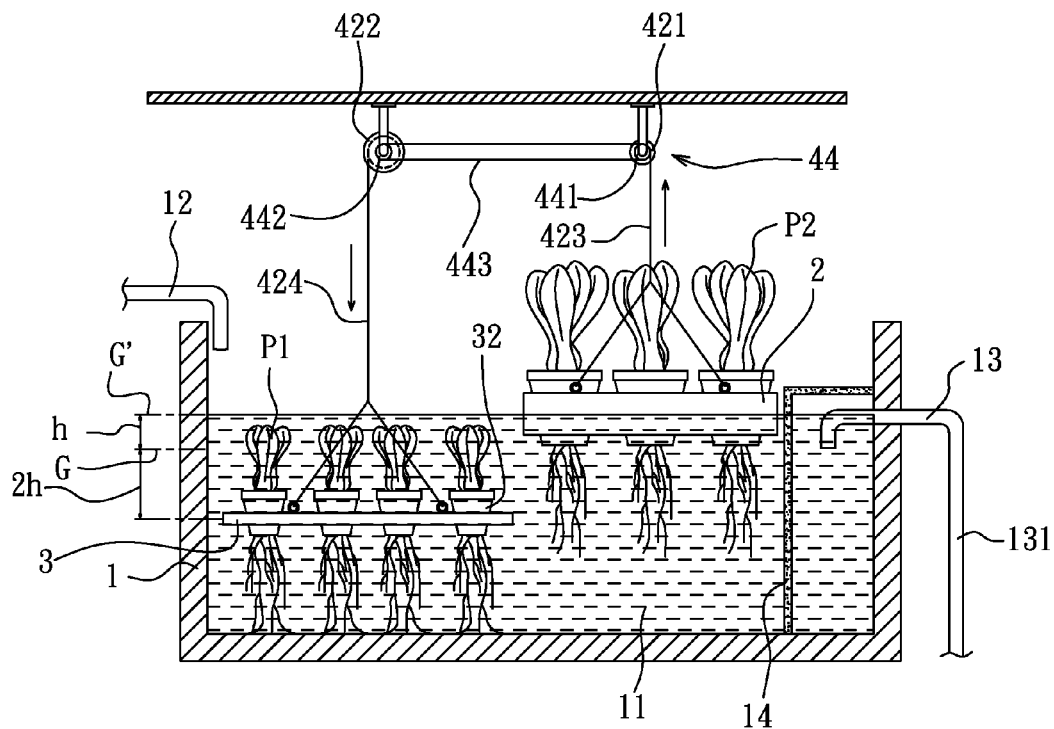
FIG. 11a is schematic drawings of the third embodiment of the present invention, illustrating the carrier dipped in the nutrient solution in the hydroponic tank.

Referring to FIG. 11a, when wishing to dip the carrier 3 and the plants P1 thereof in the nutrient solution 11 in the hydroponic tank 1, fill an extra amount of the nutrient solution 11 corresponding to one unit-height (1h) through the water intake pipe 12 into the hydroponic tank 1, causing the fluid level to be increased from the original level G shown in FIG. 9 to the new level G' shown in FIG. 11a. At this time, the float 2 with the growing plants P2 and the connected first drag rope 423 are lifted to release one unit-height (1h), and the sinking force of the carrier 3 and the plants P1 thereof pulls the second drag rope 424, causing rotation of the second transmission shaft 442. At the same time, the first transmission shaft 441 is synchronously rotated by the transmission belt 443 through one same angle (because the circumference ratio between the first transmission shaft 441 and the second transmission shaft 442 is 1:1). At this time, the small reel 421 rolls up the first drag rope 423 corresponding to the distance of one unit-height (1h) released by the float 2. At the same time, the large reel 422 releases the respective second drag ropes 424 corresponding to 2 unit-heights (2h) (because the circumference ratio between the small reel 421 and the large reel 422 is 1:2). Due to that the level of the nutrient solution 11 in the hydroponic tank 1 has been raised one unit-height (1h), the carrier 3 and the plants P1 thereof totally sink 3 unit-heights (3h)

relative to the current nutrient solution fluid level G', and therefore, the carrier 3 and the plants P1 thereof are dipped in the nutrient solution 11.

Figure 11B:
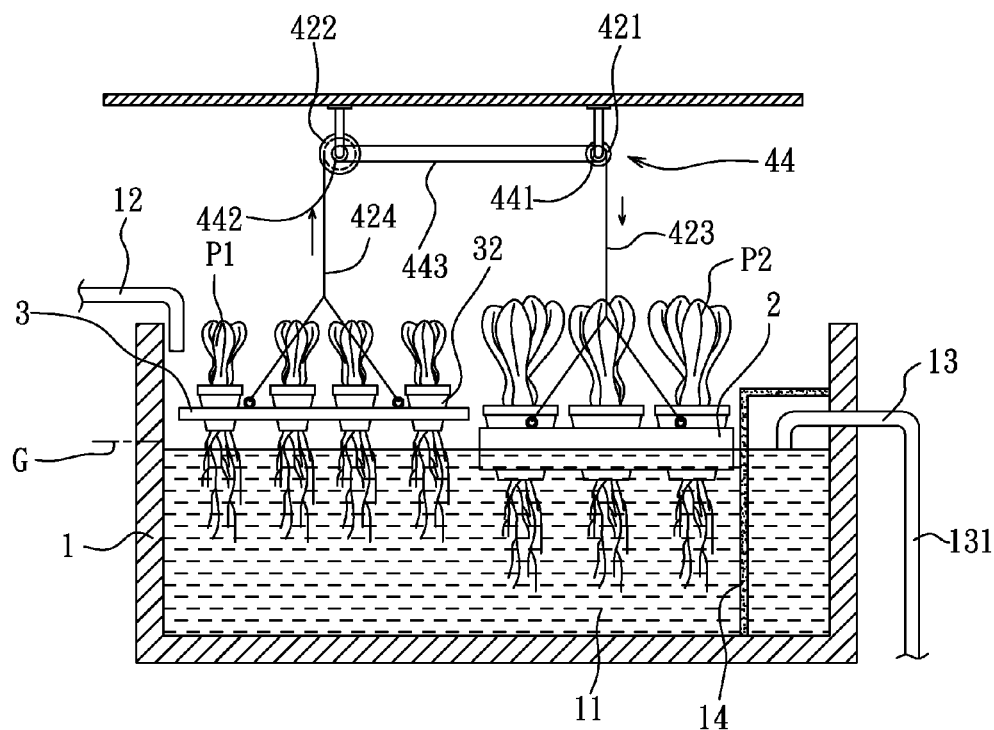
FIG. 11b is schematic drawings of the third embodiment of the present invention, illustrating the carrier lifted from the nutrient solution in the hydroponic tank.

When wishing to release the carrier 3 and the plants P1 thereof from dipping after a certain period of time in dipping, open the discharge pipe 13 to discharge the nutrient solution 11 and to lower the fluid level of the nutrient solution 11 in the hydroponic tank 1 to the elevation of the water inlet of the discharge pipe 13, as shown in FIG. 11b. At this time, the float 2 with the associated growing plants P2 float downwards from the previous fluid level G to the current fluid level of the nutrient solution 11 in the hydroponic tank 1 to drag the first drag rope 423 and to further rotate the small reel 421, causing the first transmission shaft 441 to rotate the transmission belt 443 and the second transmission shaft 442 in driving the large reel 422 to roll up the second drag rope 424 and to further lift the carriers 3, and therefore the leaves and roots of the growing plants P1 are exposed to the outside air to increase the amount of aeration of the growing plants P1.

Figure 10B:
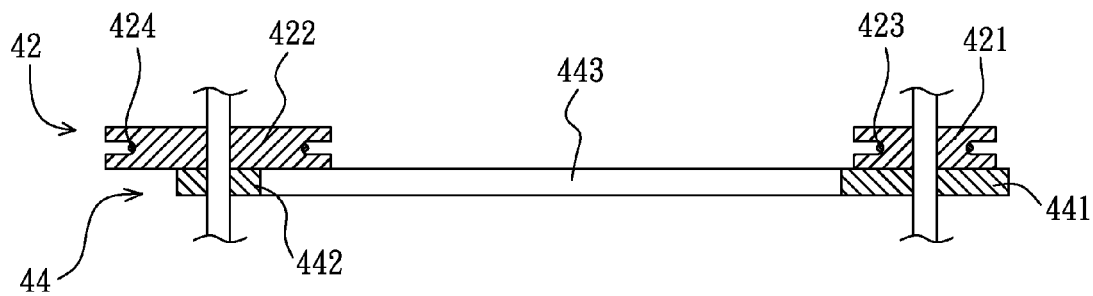
FIG. 10b corresponds to FIG. 10a, illustrating an alternate forms of the take-up mechanism and the transmission mechanism.
Figure 10C:
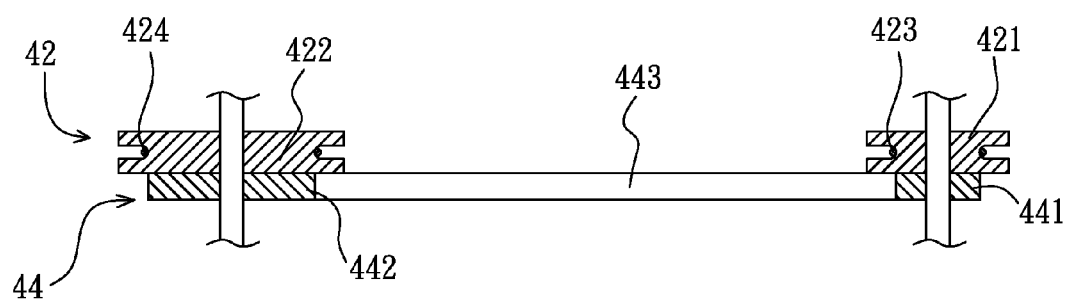
FIG. 10c corresponds to FIG. 10a, illustrating another alternate forms of the take-up mechanism and the transmission mechanism.

FIG. 10b and FIG. 10c illustrate alternate forms of the take-up mechanism and the transmission mechanism. Based on the circumference ratio between the large reel and the small reel and the circumference ratio between the first transmission shaft and the second transmission shaft, the unit-height sinking extent of the carrier 3 and the plants P1 thereof upon adding of every one unit-height (1h) of the nutrient solution 11 to the hydroponic tank 1 can be calculated subject to the following formula:

$$(x)*(y)+zh=dh$$

wherein:
x: circumference ratio between the large reel and the small reel
y: circumference ratio between first and second transmission shafts
zh: difference in height before and after filling of additional unit-height of nutrient solution
dh: unit-height carrier sinks According to the example shown in FIG. 10b, the circumference ratio between the small reel 421 and the large reel 422 is 1:2; the circumference ratio between the first transmission shaft 441 and the second transmission shaft 442 is 2:1. Thus, when adding an additional one unit-height (1h) of the nutrient solution 11 to the hydroponic tank 1, the sinking extent of the carrier 3 and the plants P1 thereof can be calculated by putting the related data into the aforesaid formula as:

$$(2/1)*(2/1)+1=5$$

i.e., the carrier 3 and the plants P1 thereof sink 5 unit-heights (5h).

According to the example shown in FIG. 10c, the circumference ratio between the small reel 421 and the large reel 422 is 1:2; the circumference ratio between the first transmission shaft 441 and the second transmission shaft 442 is 1:2. Thus, when adding an additional one unit-height (1h) of the nutrient solution 11 to the hydroponic tank 1, the sinking extent of the carrier 3 can be calculated by putting the related data into the aforesaid formula as:

$$(2/1)*(1/2)+1=2$$

i.e., the carrier 3 and the plants P1 thereof sink 2 unit-heights (2h).

Figure 12A:
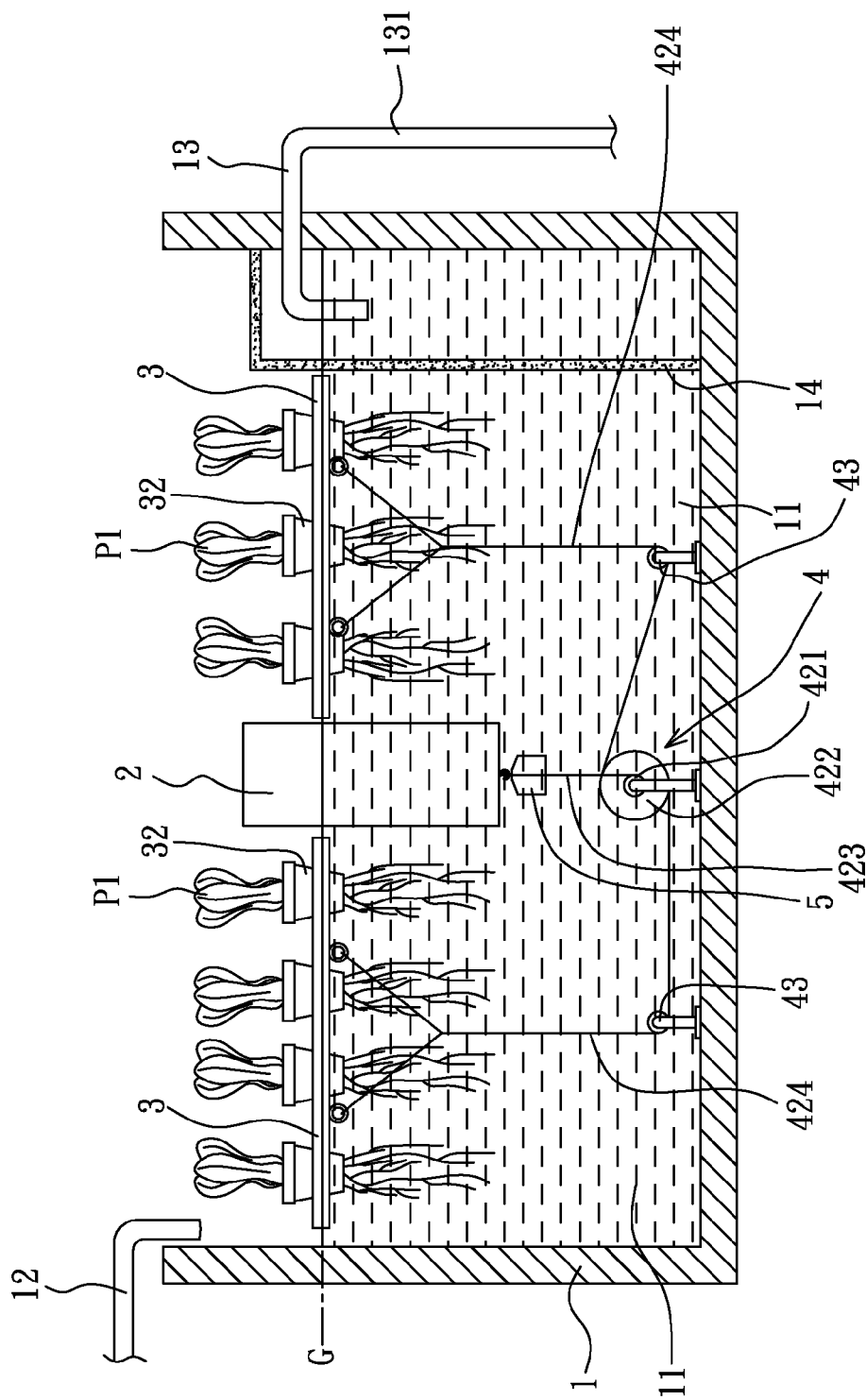
FIG. 12a is a schematic view of a hydroponic system in accordance with a fourth embodiment of the present invention.
Figure 12B:
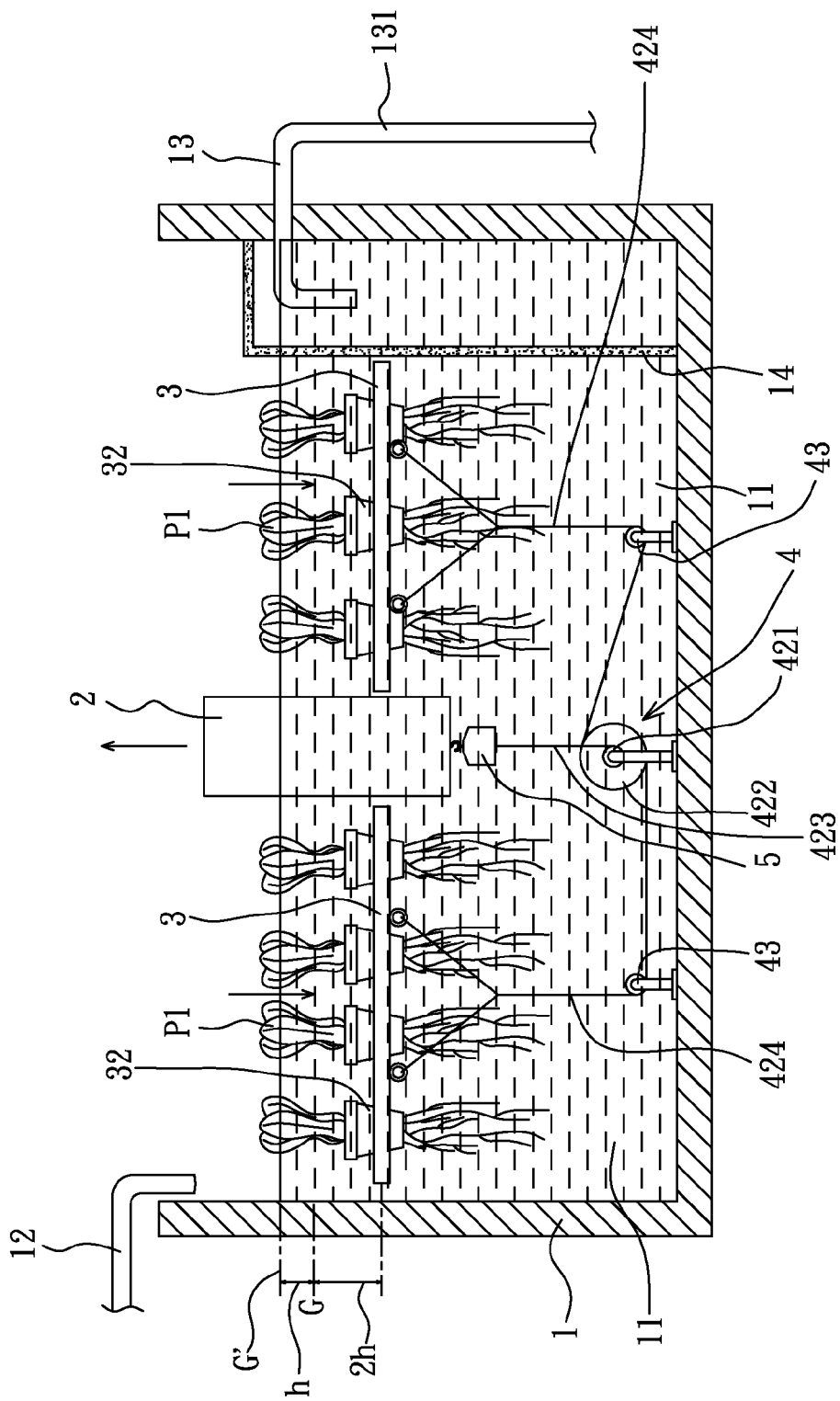
FIG. 12b corresponds to FIG. 12a, illustrating the carriers dipped in the nutrient solution in the hydroponic tank.

FIGS. 12a and 12b illustrate a hydroponic system in accordance with a fourth embodiment of the present invention. According to this fourth embodiment, the take-up mechanism 42 and guide members 43 of the supplementary lifting unit 4 are arranged at the bottom side in the hydroponic tank 1.

Further, a first drag rope 423 is wound round the small reel 421 with the free end thereof connected to the float 2; a second drag rope 424 is wound round the large reel 422 with the free end thereof connected to one carrier 3

The technical features of this embodiment are described hereinafter. The specific gravity of the float 2 and the average specific gravity of the carriers 3 and the plants P1 thereof are smaller than the nutrient solution 11; the total buoyancy of the float 2 totally immersed in the nutrient solution 11 subtracting the gross weight of the float 2 is greater the total buoyancy of the carriers 3 and the plants P1 thereof totally immersed in the nutrient solution 11 subtracting the gross weight of the carrier 3 and the plants P1 thereof then multiplying the circumference ratio between the large reel and the small reel so that the carriers 3 do not drag the float 2. Therefore, the float 2 constantly floats on the fluid level of the nutrient solution 11 in the hydroponic tank 1, and the carriers 3 are dragged by the float 2 to float on or to dip in the nutrient solution 11.

Referring to FIG. 12a again, the float 2 and the two carriers 3 having plants P1 at two sides are floating on the fluid level G of the nutrient solution 11, the roots of the plants P1 are dipping in the nutrient solution 11 to absorb nutrients from the nutrient solution 11.

Referring to FIG. 12b, when wishing to dip the carriers 3 and the plants P1 thereof in the nutrient solution 11, fill an extra amount of the nutrient solution 11 corresponding to one unit-height (1h) through the water intake pipe 12 into the hydroponic tank 1, causing the fluid level to be increased from the original level G shown in FIG. 12a to the new level G' shown in FIG. 12b. At this time, the float 2 with the connected first drag rope 423 are lifted corresponding to one unit-height (1h), the small reel 421 and the large reel 422 are rotated through one same angle. Because the circumference ratio between the small reel 421 and the large reel 422 is 1:3, the two carriers 3 and the plants P1 thereof are dragged by the second drag rope 424 downwards corresponding to 3 unit heights (3h). As the fluid level has been increased one unit-height (1h), the two carriers 3 and the plants P1 thereof sink 4 unit-heights (4h) and are dipped in the nutrient solution 11.

Thus, when the water pump pumps the prepared nutrient solution 11 through the water intake pipe 12 into the hydroponic tank 1 to increase the fluid level in the hydroponic tank 1 one unit-height (1h), the carriers 3 and the plants P1 thereof are lowered 4 unit-heights (4h) relative to the current nutrient solution fluid level, getting the result with one fourth the effort and saving much electric power. On the contrary, discharging the nutrient solution out of the hydroponic tank 1 through the discharge pipe (siphon pipe) 13 to lower the fluid level to the elevation of the water inlet of the discharge pipe 13 enable the float 2 and the carriers 3 to float on the fluid level of the nutrient solution 11.

Figure 13A:
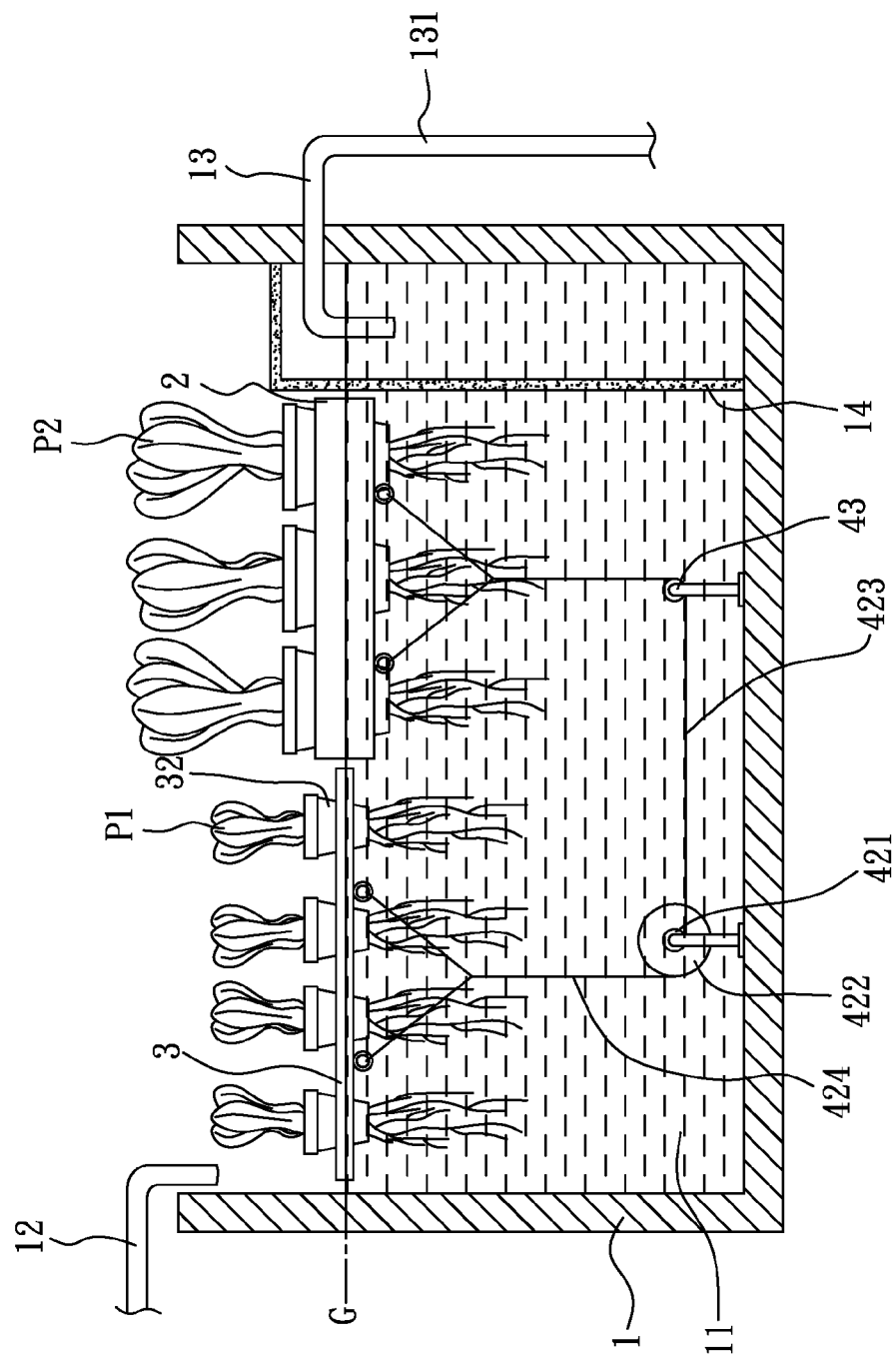
FIG. 13a is a schematic view of a hydroponic system in accordance with a fifth embodiment of the present invention.
Figure 13B:
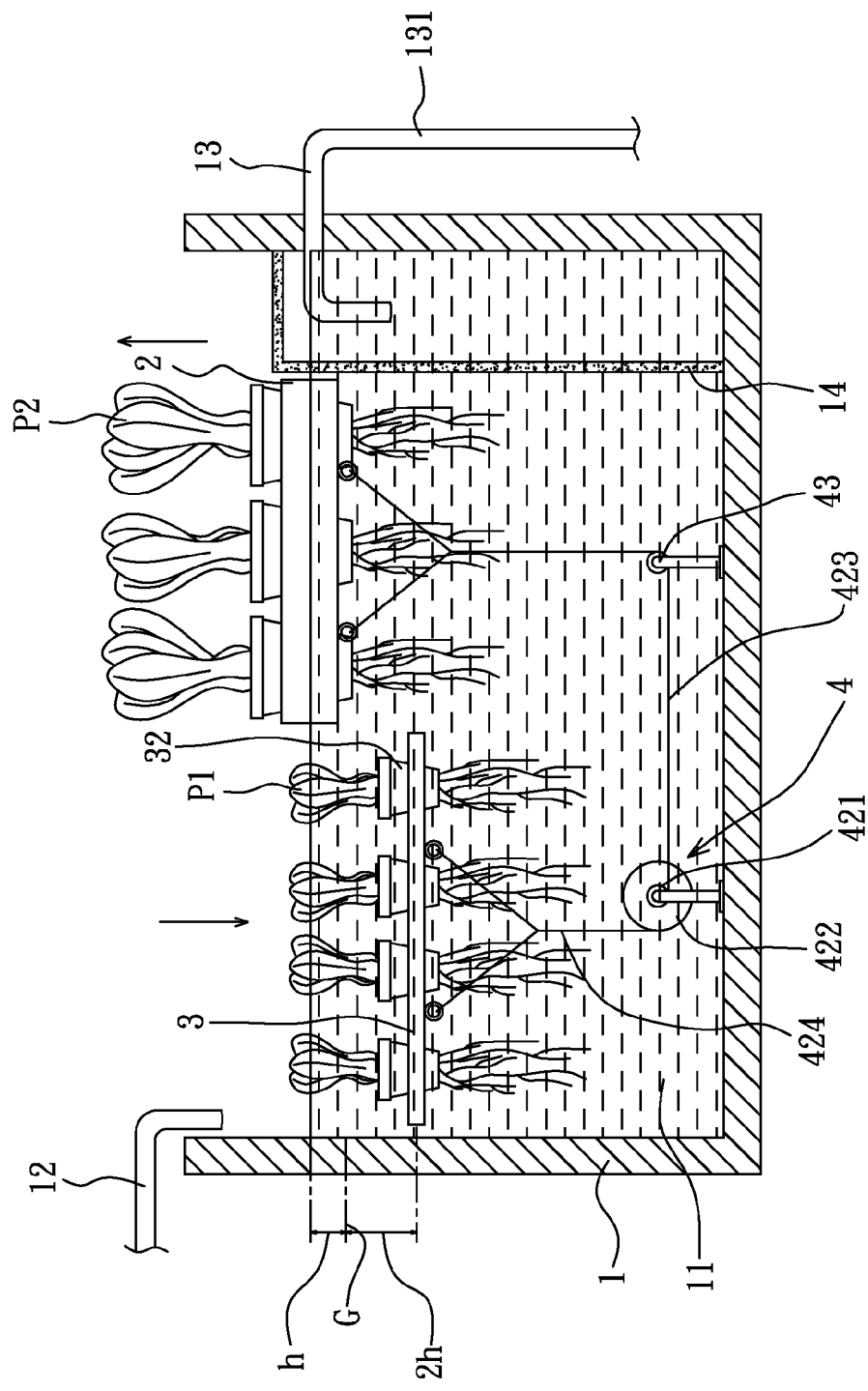
FIG. 13b corresponds to FIG. 13a, illustrating the carriers dipped in the nutrient solution in the hydroponic tank.

FIGS. 13a and 13b illustrate a hydroponic system in accordance with a fifth embodiment of the present invention. This embodiment is substantially similar to the aforesaid fourth embodiment with the exception that the float 2 is an elongated flat plate member having receptacle holes for carrying plants P2 either directly or by means of culture dishes. As the float 2 constantly floats on the fluid level of the nutrient solution 11, the plants P2 can be tall plants or those not suitable for water dipping, such as Chinese cabbage, cabbage, tomato, cucumber . . . , and etc.

The floating and dipping controls of the carrier 3 in accordance with this fifth embodiment are same as the aforesaid fourth embodiment, therefore no further detailed description in this regard is necessary.

Figure 14A:
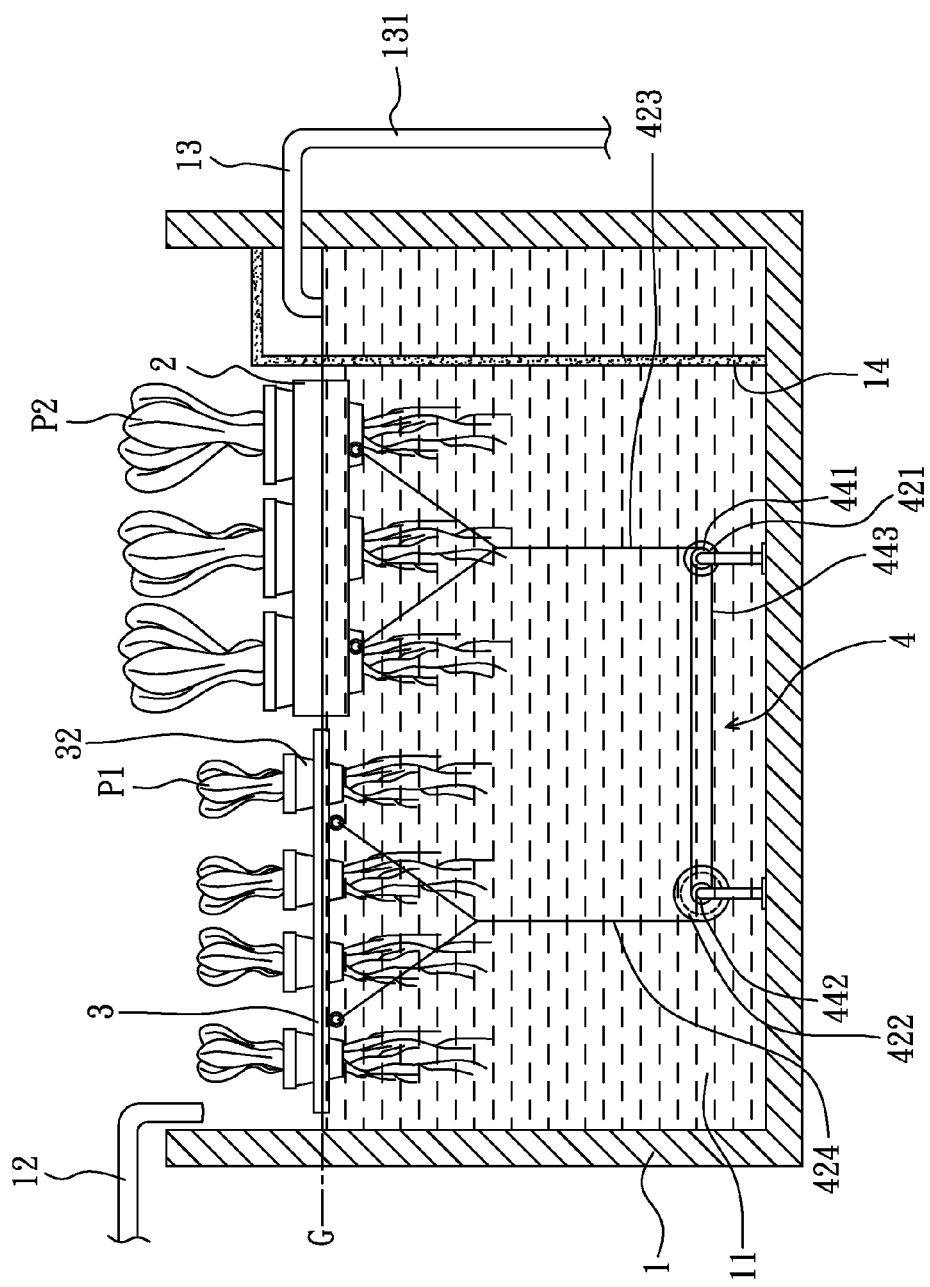
FIG. 14a is a schematic view of a hydroponic system in accordance with a sixth embodiment of the present invention.
Figure 14B:
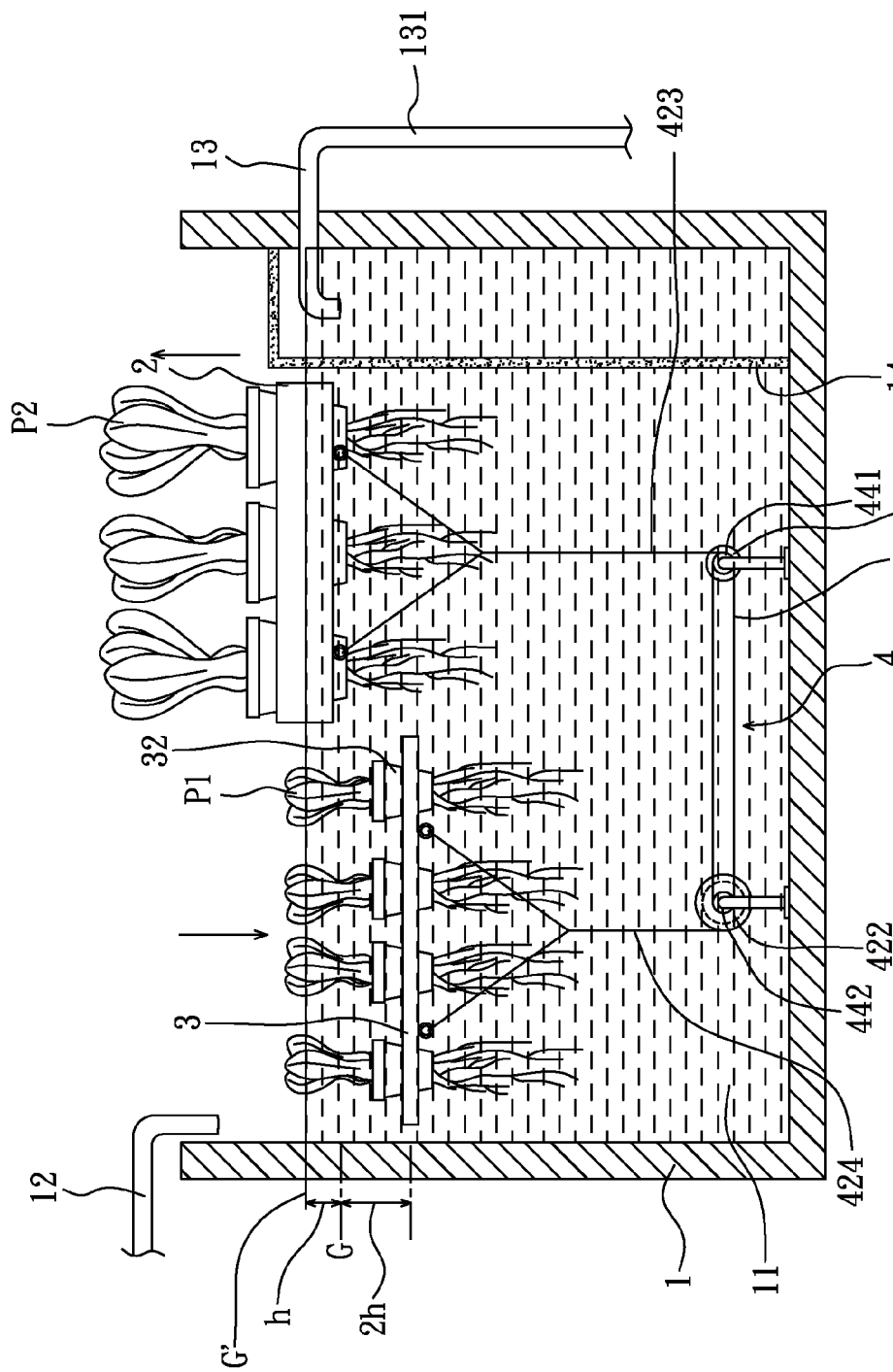
FIG. 14b corresponds to FIG. 14a, illustrating the carriers dipped in the nutrient solution in the hydroponic tank.

FIGS. 14a and 14b illustrate a hydroponic system in accordance with a sixth embodiment of the present invention. This sixth embodiment adopts the take-up mechanism 42 and the transmission mechanism 44 used in the aforesaid third embodiment. Therefore, the floating and dipping controls of the carrier 3 in accordance with this sixth embodiment are same as the aforesaid third embodiment. To avoid dragging of the float 2 by the carrier 3, the total buoyancy of the float 2 totally immersed in the nutrient solution 11 subtracting the gross weight of the float 2 must be greater than the total buoyancy of the carrier 3 and the plants P1 thereof totally immersed in the nutrient solution 11 subtracting the gross weight and the carrier 3 and the plants P1 thereof then respectively multiplying the circumference ratio between the large reel and the small reel and the circumference ratio between the first transmission shaft and the second transmission shaft.

Further, the aforesaid upright post 21, the dip-control discharge pipe and balance-control discharge pipe of the fluid level control mechanism, the take-up mechanism 42 with the transmission mechanism 44 can be selectively employed to this sixth embodiment.

Figure 15:
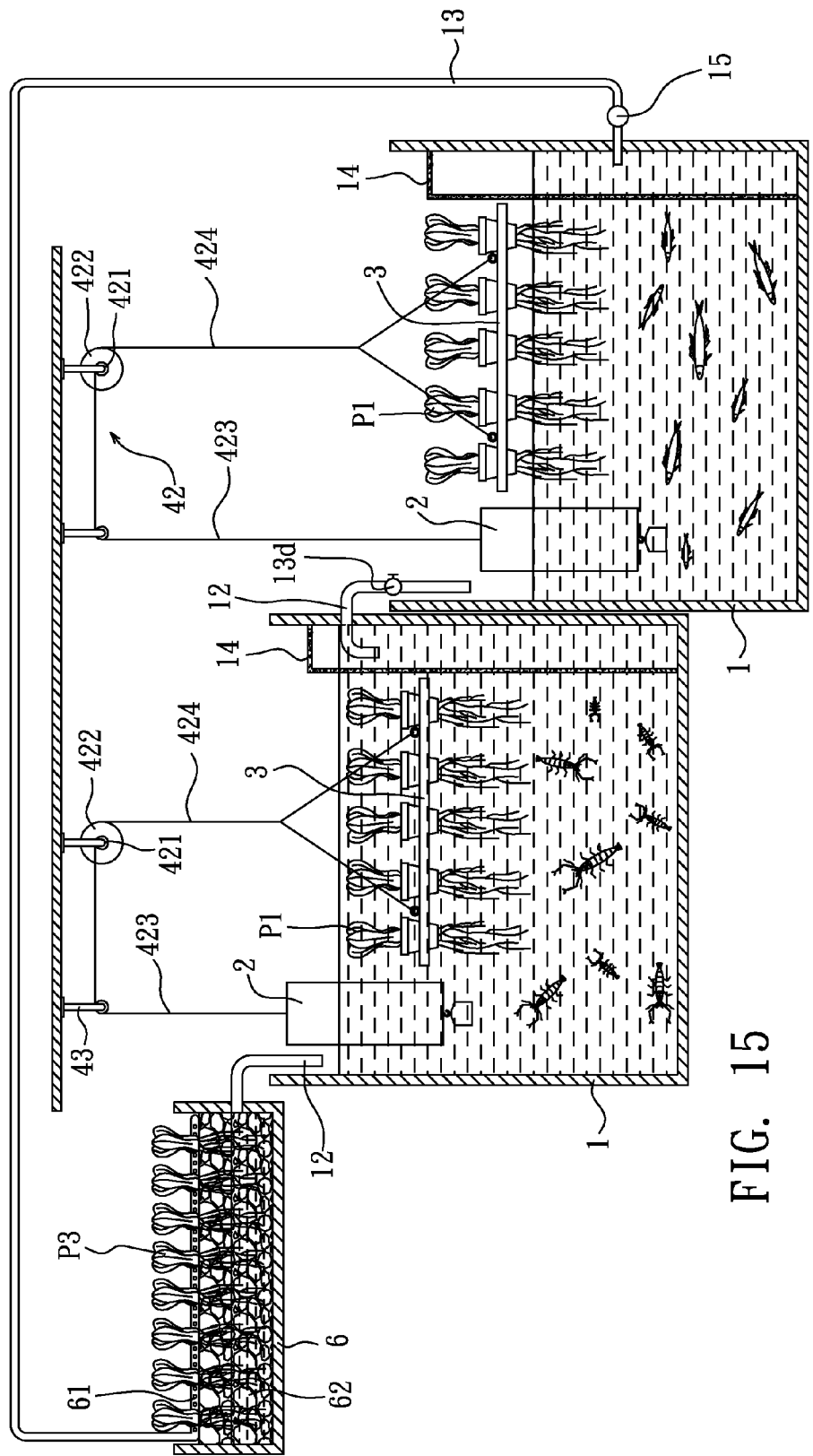
FIG. 15 is a schematic drawing of the present invention, illustrating the hydroponic system employed to an aquaculture system.

Referring to FIG. 15, the hydroponic system can be used in an aquaculture system to purify water in rearing tanks. As illustrated, the aquaculture system comprises a plurality of, for example, two hydroponic tanks 1, and one filtration pool 6. The two hydroponic tanks 1 are arranged side by side. The floats 2, the carriers 3 having the plants P1, and the supplementary lifting units 4 are arranged according to the aforesaid second embodiment as shown in FIG. 6. The first hydroponic tank 1 at the upstream and the second hydroponic tank 1 at the downstream can be respectively used for farming different aquatic species, such as, shrimps, fishes, crabs, shellfishes, etc.

The first water intake pipe 12 of the first hydroponic tank 1 actually is the discharge pipe of the filtration pool 6; the second water intake pipe 12 of the second hydroponic tank 1 is the discharge pipe of the first hydroponic tank 1. A control valve 13d is installed in the second water intake pipe 12 for controlling the fluid level of the nutrient solution 11 in the second hydroponic tank 1. A water pump 15 is connected to the discharge pipe 13 of the second hydroponic tank 1 for pumping the nutrient solution 11 out of the second hydroponic tank 1 into the filtration pool 6 through a drip pipe 61. Filtration grains 62 are arranged in the filtration pool 6 for growing plants P3 and for use as a bio-reaction bed to facilitate bacteria growth.

The metabolic products produced by the aquatic animals in each hydroponic tank 1, such as stool and urine, are mixed with the nutrient solution 11 and then discharged through discharge pipe 13 into the filtration pool 6 where insoluble impurities are removed from the nutrient solution 11 by the filtration grains 62. By means of using bacteria to perform a biochemical treatment, the nutrient solution 11 is purified.

The filtrated and purified nutrient solution 11 is then delivered through the water intake pipes 12 into the hydroponic tanks 1 to increase the fluid level and to lift the floats 2. When the floats 2 are lifted, the carriers 3 and the plants P1 thereof are relatively lowered and dipped in the nutrient solution 11. At this time, the roots, stems and leaves of the growing plants P1 absorb nutrients from the nutrient solution 11. Ammonia and other substances that cannot be directly utilized by the plants can be converted by bacteria at the roots of the plants or in the filtration pool 6 into nitrite and then converted into nitrate for absorption by the plants.

Thus, by means of employing the hydroponic system of the present invention to a conventional aquaculture system, impurities that cannot settle down or be filtrated, such as ammonia, can be converted by bacteria at the roots of the plants and in the filtration pool 6 into nutrients for the plants.

The use of the hydroponic system in an aquaculture system can not only purify the nutrient solution but also save water and energy consumption.

Subject to the application of the present invention, floats and carriers having plants are linked to a supplementary lifting unit so that floats constantly float on the fluid level of the nutrient solution in the nutrient tank. When adding an extra amount of the nutrient solution to the hydroponic tank to lift the float corresponding to one unit-height, the carriers with the plants carried or grown thereon are lowered at least 2 unit-heights and dipped in the nutrient solution, thus, the stems and leaves of the growing plants can absorb nutrients from the nutrient solution for quick growing. This potential energy change by means of adding the nutrient solution corresponding to one unit-height to lower the carriers and the plants thereof at least 2 unit-heights greatly shorten the operating time of the water pump, thereby saving energy consumption. Therefore, the invention satisfies the practice of energy saving and carbon reduction.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A hydroponic system, comprising:
   a hydroponic tank, said hydroponic tank having at least one water intake pipe for guiding in a nutrient solution and at least one discharge pipe for discharging of said nutrient solution out of said hydroponic tank;
   at least one float and at least one carrier for growing plants, each said float having a specific gravity smaller than the specific gravity of said nutrient solution, each said carrier and the plants thereof having an average specific gravity greater than the specific gravity of said nutrient solution; and
   a supplementary lifting unit, said supplementary lifting unit comprising at least one take-up mechanism arranged above said nutrient solution in said hydroponic tank, each said take-up mechanism comprising at least one small reel, at least one large reel, a first drag rope wound round each said small reel and having a free end connected to said at least one float and a second drag rope wound round each said large reel and having a free end connected to said at least one carrier, the circumference ratio between each said small reel and each said large reel being 1:≥1;
   wherein said at least one float has a gross weight greater than the gross weight of said at least one carrier and the plants thereof subtracting the total buoyancy of the carrier totally immersed in the nutrient solution then multiplying the circumference ratio between said large reel and said small reel; adding said nutrient solution through said at least one water intake pipe into said hydroponic tank to lift said at least one float corresponding to one unit-height or discharging said nutrient solution out of said hydroponic tank through said at least one discharge pipe to lower said float corresponding to one unit-height causes said at least one carrier to be lowered or lifted the height corresponding to the circumference ratio between said large reel and said small reel plus one unit-height for enabling the roots, stems and leaves of the growing plants to be dipped in said nutrient solution in said hydroponic tank or exposed to the outside air.

2. The hydroponic system as claimed in claim 1, wherein each said float carries at least one plant.

3. The hydroponic system as claimed in claim 1, wherein said supplementary lifting unit further comprises at least a support member horizontally disposed above said hydroponic tank to pivotally support said at least one take-up mechanism above said nutrient solution in said hydroponic tank, and at least one guide member optionally and pivotally mounted at said support member to guide movement of said first drag rope and said second drag rope.

4. The hydroponic system as claimed in claim 3, wherein said small reel and said large reel are respectively formed of a pulley; said guide members are selected from the group of guide pulleys and fixed rings.

5. The hydroponic system as claimed in claim 1, wherein each said take-up mechanism comprises a pivot shaft, one small reel mounted on said pivot shaft and at least one large reel mounted on said pivot shaft and keeps at a predetermined distance from each other.

6. The hydroponic system as claimed in claim 1, further comprising at least one weight selectively attached to said at least one float and/or said at least one carrier to adjust the specific gravity.

7. The hydroponic system as claimed in claim 1, further comprising a fluid level control mechanism installed in said hydroponic tank, said fluid level control mechanism comprising a dip-control discharge pipe and a balance-control discharge pipe, the balance-control discharge pipe is installed with a control valve for opening/closing said dip-control discharge pipe and said balance-control discharge pipe respectively to regulate the fluid level of said nutrient solution in said hydroponic tank for enabling said at least one float to float on the fluid level of said nutrient solution in said hydroponic tank constantly and said at last one carrier to be dipped in said nutrient solution in said hydroponic tank or to float on the fluid level of said nutrient solution in said hydroponic tank.

8. The hydroponic system as claimed in claim 7, wherein said fluid level control mechanism further comprises an aeration-control discharge pipe, a control valve installed in said aeration-control discharge pipe for opening/closing said aeration-control discharge pipe to regulate the fluid level of said nutrient solution in said hydroponic tank for enabling said at least one carrier to be lifted above the fluid level of said nutrient solution in said hydroponic tank.

9. The hydroponic system as claimed in claim 1, wherein said supplementary lifting unit further comprises a transmission mechanism, said transmission mechanism comprising a first transmission shaft affixed to one said small reel, a second transmission shaft affixed to one said large reel and a transmission belt coupled between said first transmission shaft and said second transmission shaft for enabling said first transmission shaft and said second transmission shaft to be synchronously rotated with the associating small reel and large reel; said at least one float has a gross weight greater than the gross weight of said at least one carrier and the plants thereof subtracting the total buoyancy of the carrier totally immersed in the nutrient solution then respectively multiplying the circumference ratio between said large reel and said small reel and the circumference ratio between said first transmission shaft and said second transmission shaft so that filling an extra amount of said nutrient solution into said hydroponic tank through said at least one water intake pipe to increase the fluid level in said hydroponic tank corresponding to one unit-height or discharging said nutrient solution out of said hydroponic tank through said at least one discharge pipe to lower the fluid level in said hydroponic tank one unit-height causes each said carrier to be lifted or lowered the height corresponding to the circumference ratio between each said large reel and each said small reel multiplying the circumference ratio between said first transmission shaft and said second transmission shaft plus one unit-height for enabling the roots, stems and leaves of the growing plants to be dipped in said nutrient solution in said hydroponic tank or exposed to the outside air.

10. The hydroponic system as claimed in claim 9, wherein said first transmission shaft and said second transmission shaft are selected from the group of belt wheels and gearwheels, and said transmission belt is selected from the group of belt and chain.

* * * * *